United States Patent
Izadian

(10) Patent No.: US 9,577,541 B2
(45) Date of Patent: Feb. 21, 2017

(54) SINGLE SWITCH INFINITE-LEVEL POWER INVERTERS

(71) Applicant: Indiana University Research and Technology Corporation, Indianapolis, IN (US)

(72) Inventor: Afshin Izadian, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 12 days.

(21) Appl. No.: 14/386,394

(22) PCT Filed: Mar. 15, 2013

(86) PCT No.: PCT/US2013/031939
§ 371 (c)(1),
(2) Date: Sep. 19, 2014

(87) PCT Pub. No.: WO2013/142312
PCT Pub. Date: Sep. 26, 2013

(65) Prior Publication Data
US 2015/0049519 A1    Feb. 19, 2015

Related U.S. Application Data

(60) Provisional application No. 61/613,372, filed on Mar. 20, 2012, provisional application No. 61/655,271, (Continued)

(51) Int. Cl.
G05F 1/00 (2006.01)
H02M 3/335 (2006.01)
(Continued)

(52) U.S. Cl.
CPC .......... *H02M 3/33546* (2013.01); *H02M 1/08* (2013.01); *H02M 7/537* (2013.01); *H02M 3/33576* (2013.01); *H02M 7/4807* (2013.01)

(58) Field of Classification Search
CPC .............. G05F 1/44; G05F 1/445; G05F 1/45; G05F 1/461; G05F 1/56; G05F 1/563; G05F 1/565; G05F 1/575; G05F 1/59; H02M 2001/0025; H02M 1/084; H02M 1/0845; H02M 3/156; H02M 3/157158; H02M 3/315; H02M 3/1582; H02M 3/3155; H02M 3/335; H02M 3/33507; H02M 3/33515; H02M 3/33523; H02M 3/33561; H02M 3/33569; H02M 3/33576; H02M 3/33592; H02M 7/53871
(Continued)

(56) References Cited

U.S. PATENT DOCUMENTS

| 4,396,818 A * | 8/1983 | Kominami ............ H05B 6/062 219/625 |
| 6,069,804 A * | 5/2000 | Ingman ................. H02J 7/0068 363/124 |

(Continued)

OTHER PUBLICATIONS

Nickitas-Etienne, Athina, International Search Report and Written Opinion of the International Searching Authority corresponding to PCT Application No. PCT/US2013/031939, International Bureau of WIPO, Geneva, Switzerland, Oct. 2, 2014 (8 pages).

(Continued)

*Primary Examiner* — Adolf Berhane
*Assistant Examiner* — Gary Nash
(74) *Attorney, Agent, or Firm* — Faegre Baker Daniels LLP

(57) ABSTRACT

An electrical power converter includes a circuit with a single switching transistor that is electrically connected to a direct current power source, a first inductor-capacitor (LC) circuit electrically connected to the single switching transistor, a (Continued)

second LC circuit electrically connected to the first LC circuit and configured to provide an output signal to a load. A controller is operatively connected to the single switching transistor. The controller identifies an error between the output signal of the circuit and a reference signal and adjusts a duty cycle of a pulse width modulation (PWM) switching signal to switch the single switching transistor at a predetermined frequency with the adjusted duty cycle to reduce the identified error.

16 Claims, 28 Drawing Sheets

Related U.S. Application Data filed on Jun. 4, 2012, provisional application No. 61/675,618, filed on Jul. 25, 2012, provisional application No. 61/695,175, filed on Aug. 30, 2012, provisional application No. 61/746,924, filed on Dec. 28, 2012.

(51) Int. Cl.
    *H02M 7/757*      (2006.01)
    *H02M 1/08*      (2006.01)
    *H02M 7/537*      (2006.01)
    *H02M 7/48*      (2007.01)

(58) Field of Classification Search
USPC ....... 323/241, 242, 246, 274–276, 279, 280, 323/283–285, 288; 363/20–21.02, 363/21.04–21.06, 21.1, 21.11, 363/21.12–21.14, 21.18, 78, 79
See application file for complete search history.

(56) References Cited

U.S. PATENT DOCUMENTS

| | | | |
|---|---|---|---|
| 6,653,824 B1 * | 11/2003 | Whitlock | G05F 1/40 323/344 |
| 2004/0027111 A1 * | 2/2004 | Lee | G01J 5/24 323/288 |
| 2004/0037100 A1 * | 2/2004 | Orr | H02M 3/33576 363/131 |
| 2007/0171680 A1 * | 7/2007 | Perreault | H02M 1/34 363/16 |
| 2007/0221267 A1 | 9/2007 | Fornage | |
| 2010/0296324 A1 | 11/2010 | Boeke | |
| 2011/0012575 A1 | 1/2011 | Midya et al. | |
| 2011/0036386 A1 | 2/2011 | Browder | |
| 2011/0205762 A1 * | 8/2011 | Pan | H02M 7/4807 363/21.04 |
| 2011/0264288 A1 | 10/2011 | Khajehoddin et al. | |
| 2012/0013322 A1 | 1/2012 | Dearborn | |
| 2012/0051101 A1 | 3/2012 | El-Barbari et al. | |
| 2012/0051110 A1 | 3/2012 | Yuan et al. | |
| 2012/0057383 A1 | 3/2012 | Wei et al. | |

OTHER PUBLICATIONS

Yi Cao; Configurable Simulink Model for DC-DC Converters; Matlab Central; Feb. 19, 2008 (updated Apr. 1, 2009); 5 Pages; http://www.mathworks.com/matlabcentral/fileexchange/18833-configurable-simulink-model-for-dc-dc-converters-with-pwm-pi-control.
Richard S. Sutton; Gain Adaptation Beats Least Squares?; Proceedings of the Seventh Yale Workshop on Adaptive and Learning Systems; 1992; pp. 161-166.
König et al.; Adaptive Pointing—Implicit Gain Adaptation for Absolute Pointing Devices; CHI; Apr. 4-9, 2009; 6 Pages; Boston, MA, USA.
LM3485 Design Document; National Semiconductor; Jun. 2006; 6 Pages; www.national.com.
Ioannou, Petros; Robust Adaptive Control; University of Southern California; Jun. 18, 2003; 834 Pages.
PMP2778 Test Results; Power Management Solutions; Texas Instruments; Jul. 30, 2007; 6 Pages.
Jeff Falin; Designing DC/DC converters based on SEPIC topology; Analog Applications Journal; Texas Instruments Incorporated; 4th Quarter, 2008; pp. 18-26; www.ti.com/aaj.
Jeff Falin; Designing DC/DC converters based on ZETA topology; Analog Applications Journal; Texas Instruments Incorporated; 2nd Quarter, 2010; pp. 16-23; www.ti.com/aaj.
Chinese Office Action in CN201380026161.1 dated Jun. 29, 2016 (9 pages).
Chinese Office Action in CN201380026161.1 dated Jun. 29, 2016, English Translation (6 pages).

* cited by examiner

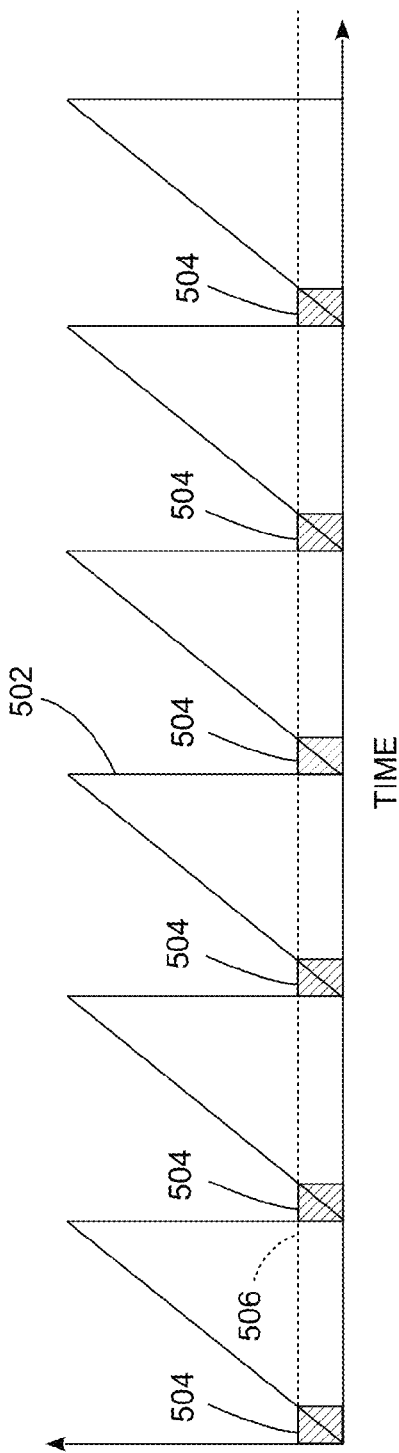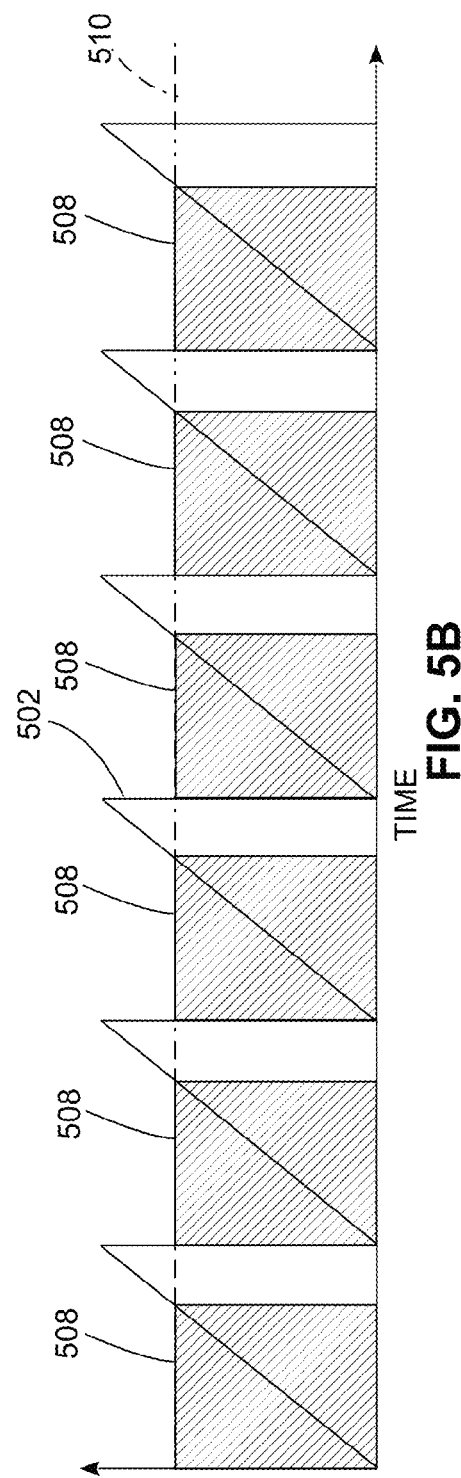

LOAD: 32.9 kW

LOAD: 38.4 kW

LOAD: 46.08 kW

LOAD: 57.5 kW

LOAD: 76.8 kW

SINGLE SWITCH INFINITE-LEVEL POWER INVERTERS

CLAIM OF PRIORITY

This application claims priority to U.S. Provisional Application No. 61/613,372, which is entitled "Single Switch Inverter," and was filed on Mar. 20, 2012. This application claims priority to U.S. Provisional Application No. 61/655,271, which is entitled "Single-Phase and Three-Phase Single Switching Transistor Inverter," and was filed on Jun. 4, 2012. This application claims further priority to U.S. Provisional Application No. 61/675,618, which is entitled "Single Switch Inverter with Isolation," and was filed on Jul. 25, 2012. This application claims further priority to U.S. Provisional Application No. 61/695,175,which is entitled "Synchronous Single Switch Inverter With And Without Isolation," and was filed on Aug. 30, 2012. This application claims further priority to U.S. Provisional Application No. 61/746,924, which is entitled "Synchronous Single Switch Inverter With A Maximum Current And Power Limiter And Parallel Operation," and was filed on Dec. 28, 2012. This application claims priority to PCT Application No. PCT/US2013/031939, which is entitled "Single Switch Infinite-Level Power Inverters," and was filed on Mar. 15, 2013. The entire disclosure of each of the above-listed applications are hereby expressly incorporated herein by reference.

TECHNICAL FIELD

The present description generally relates to electrical power conversion systems including systems that convert a first direct current (DC) signal to a second DC signal and convert a DC signal to a desired alternating current (AC) signal. The inverter uses a synchronous polarity selecting circuit. The inverter can be synchronized with any source and operated in parallel with other power sources.

BACKGROUND

Many devices that are powered through electrical current operate using either direct current (DC) or alternating current (AC) power. Various devices convert AC current from an electrical power source to DC current, and convert DC current to AC current. Electrical inverters are one example of devices that generate an AC output power signal using a DC input signal as a source. In two common configurations, an inverter generates an AC signal with a sinusoidal waveform having an output voltage of approximately 120 volts and a frequency of 60 Hz to conform with power grids in the United States and other countries, or with an output voltage of approximately 240 V and a frequency of 50 Hz to conform to power grids in Europe and Asia.

In a typical inverter design, four transistors are switched at high-speed to generate a sinusoidal AC waveform from an input DC waveform. The transistors switch on and off repeatedly to invert the DC signal source between positive and negative voltage values so that the output signal approximates an AC sinusoidal signal. Typically, the high-frequency switching transistors switch on and off at a much higher frequency than the frequency of the AC output signal. A portion of the input energy from the DC signal source is lost each time one of the four transistors switches between an on and an off state. The switching loss due to the switching transistors increases as the desired frequency of the AC output signal increases because the transistors switch at a higher frequency to generate the AC signal. Additionally, existing inverters are typically configured to accept power from a stable DC power source that does not vary substantially over time and to provide the AC power output to a load with a substantially constant resistance. If either the DC power input or load output resistance varies during operation, existing inverters may become unstable and produce output power signals that deviate from the desired AC output waveform. Consequently, improvements to DC to AC inverters that operate more efficiently and provide stable AC power signals would be beneficial.

SUMMARY

In one embodiment a power electronic converter includes a circuit having a single switching transistor electrically connected to a direct current (DC) power source having a first voltage level, a first inductor-capacitor circuit electrically connected to the output of the single switching transistor and configured to receive electrical power from the DC power source through the single switching transistor in response to the switching transistor being switched on, and a second inductor-capacitor circuit electrically connected first inductor-capacitor circuit and configured to provide an output voltage to a load. The power converter also includes a controller operatively connected to the single switching transistor. The controller is configured to identify an error between the output signal of the circuit and a reference signal, a voltage of the reference signal being at a second voltage level that is different than the first voltage level, and adjust a duty cycle of a pulse width modulation (PWM) switching signal to switch the single switching transistor at a predetermined frequency with the adjusted duty cycle to reduce the identified error.

In another embodiment, electrical power conditioning system includes a circuit having a single switching transistor configured to be electrically connected to a direct current (DC) power source, and an electrical switching device having an input electrically connected to an output of the single switching transistor and configured to switch at a first predetermined frequency to generate an output signal from a DC input supplied by the DC power source. The electrical power conditioning system also includes a reference signal generator configured to generate an AC reference signal waveform having the first predetermined frequency that corresponds to a predetermined signal for an external AC signal generator, a signal sensor configured to measure a combination of an external AC signal from the external AC generator and the output signal of the circuit, the external AC signal including a noise component, and a controller operatively connected to the single switching transistor, the reference signal generator, and the signal sensor. The controller is configured to identify an error between the AC reference signal and the combination of the external AC signal with the noise component and the output signal, and adjust a duty cycle of a pulse width modulation (PWM) switching signal to switch the single switching transistor at a second predetermined frequency with the adjusted duty cycle to reduce or eliminate the noise component in the combination of the external AC signal and the output signal.

In another embodiment, an electrical inverter system is configured to limit a magnitude of an alternating current (AC) output. The inverter system includes an a inverter circuit having a single switching transistor configured to be electrically connected to a direct current (DC) power source, an electrical switching device having an input electrically connected to an output of the single switching transistor and configured to switch at a predetermined frequency to generate an alternating current (AC) output from a DC input supplied by the DC power source, an electrical current sensor configured to generate a signal corresponding to a magnitude of the AC output, a bypass switch electrically connected to the single switching transistor. The inverter system also includes a controller that is operatively connected to the single switching transistor, the electrical current sensor, and the bypass switch. The controller is configured to identify a current magnitude of the AC output with reference to the signal received from the electrical current sensor, operate the bypass switch to change from a first configuration to a second configuration in response to the identified current magnitude of the AC output being greater than a predetermined threshold, the bypass switch in the second configuration being configured to send a control signal to the single switching transistor to prevent a flow of the DC electrical current through the single switching transistor, generate a pulse width modulation (PWM) switching signal to switch the single switching transistor at a predetermined frequency only in response to the bypass switch being in the first configuration, identify an error between a voltage level of an AC reference signal and a measured voltage level of an output signal from the inverter circuit only in response to the bypass switch being in the first configuration, and set a duty cycle of the PWM switching signal to reduce the identified error only in response to the bypass switch being in the first configuration.

In another embodiment, an electrical inverter system has been developed. The system includes a first inverter circuit and a second inverter circuit. The first inverter circuit includes a first single switching transistor configured to be electrically connected to a first direct current (DC) power source, a reference signal generator configured to generate an alternating current (AC) signal that corresponds to an output AC for the first inverter circuit, a first electrical switching device having an input electrically connected to the DC power source and configured to switch at a first predetermined frequency to generate a first alternating current (AC) output from a DC input supplied by the first DC power source, and a first controller operatively connected to the first single switching transistor. The first controller is configured to generate a first pulse width modulation (PWM) switching signal to switch the first single switching transistor at a second predetermined frequency, the second predetermined frequency being greater than the first predetermined frequency, identify a first error between a voltage level of the AC reference signal and a measured voltage level of the first AC output from the first inverter circuit, and set a duty cycle of the first PWM switching signal to reduce the first identified error. The second inverter circuit includes a second single switching transistor configured to be electrically connected to a second direct current (DC) power source, a second electrical switching device having an input electrically connected to the second DC power source and configured to switch at the first predetermined frequency to generate a second alternating current (AC) output from the second DC input supplied by the second DC power source, and a second controller operatively connected to the second single switching transistor. The second controller is configured to generate a second pulse width modulation (PWM) switching signal to switch the second single switching transistor at the second predetermined frequency, identify a second error between a voltage level of the AC reference signal from the reference signal generator in the first inverter circuit and a measured voltage level of the second AC output from the second inverter circuit, and set a duty cycle of the second PWM switching signal to reduce the second identified error.

In another embodiment, an electrical inverter system has been developed. The system includes a first inverter circuit and a second inverter circuit. The first inverters circuit includes a first single switching transistor configured to be electrically connected to a first direct current (DC) power source, and a first electrical switching device having an input electrically connected to the first DC power source and configured to switch at a first predetermined frequency to generate a first alternating current (AC) output from a DC input supplied by the first DC power source, the first predetermined frequency being a frequency of a first AC signal in a power grid that receives the first AC output from the first inverter circuit, and a first controller operatively connected to the first single switching transistor. The first controller is configured to generate a first pulse width modulation (PWM) switching signal to switch the first single switching transistor at a second predetermined frequency, the second predetermined frequency being greater than the first predetermined frequency, identify a first error between a voltage level of the first AC signal in the power grid and a measured voltage level of the first AC output from the first inverter circuit, and set a duty cycle of the first PWM switching signal to reduce the first identified error. The second inverter circuit includes a second single switching transistor configured to be electrically connected to a second direct current (DC) power source, a second electrical switching device having an input electrically connected to the second DC power source and configured to switch at the first predetermined frequency to generate a second alternating current (AC) output from a second DC input supplied by the second DC power source, the second inverter circuit being configured to deliver the second AC output to the power grid, and a second controller operatively connected to the second single switching transistor. The second controller is configured to generate a second pulse width modulation (PWM) switching signal to switch the second single switching transistor at the second predetermined frequency, identify a second error between a voltage level of a second AC signal from the power grid and a measured voltage level of the second AC output from the second inverter circuit, and set a second duty cycle of the second PWM switching signal to reduce the second identified error.

In another embodiment, an electrical inverter system includes an inverter circuit having a single switching transistor configured to be electrically connected to a direct current (DC) power source and an electrical switching device electrically connected to the single switching transistor and configured to switch at a predetermined frequency to generate an alternating current (AC) output from a DC input supplied by the DC power source. The electrical inverter system also includes a comparator configured to generate a switching signal to switch the single switching transistor on and off with reference to an identified difference between a predetermined reference model of an AC output signal and a measured AC output signal from the inverter circuit and an adaptive controller configured to set a duty cycle of the switching signal with reference to a gain adaptation feedback from the switching signal.

In another embodiment, an electrical inverter system an inverter circuit includes a single switching transistor configured to be electrically connected to a direct current (DC) power source, a transformer having an input electrically connected to an output of the single switching transistor, and an electrical switching device having an input electrically connected to an output of the transformer and configured to switch at a predetermined frequency to generate an alternating current (AC) output from a DC input supplied by the DC power source. The electrical inverter system also includes a controller operatively connected to the single switching transistor. The controller is configured to generate a pulse width modulation (PWM) switching signal to switch the single switching transistor at a predetermined frequency, identify an error between a voltage level of an AC reference signal and a measured voltage level of an output signal from the inverter circuit, and set a duty cycle of the PWM switching signal to reduce the identified error.

In another embodiment, an inverter system includes a circuit having a single switching transistor configured to be electrically connected to a direct current (DC) power source and an electrical switching device electrically connected to the single switching transistor and configured to switch at a predetermined frequency to generate an alternating current (AC) output from a DC input supplied by the DC power source. The inverter also includes a controller operatively connected to the single switching transistor. The controller is configured to generate a pulse width modulation (PWM) switching signal to switch the single switching transistor at a predetermined frequency, identify an error between a voltage level of an AC reference signal and a measured voltage level of an output signal from the inverter circuit, and set a duty cycle of the PWM switching signal to reduce the identified error.

In another embodiment, an electrical inverter system includes a plurality of inverter circuits. Each inverter circuit is configured to be electrically connected to a direct current (DC) power source. Each inverter circuit includes a single switching transistor configured to be electrically connected to the (DC) power source and an electrical switching device electrically connected to the single switching transistor and configured to switch at a predetermined frequency to generate an alternating current (AC) output corresponding to a single phase of a multi-phase output signal from a DC input supplied by the DC power source. The electrical inverter system also includes a plurality of signal generators, each signal generator being configured to generate an AC reference signal corresponding to a single phase of the multi-phase output signal, and a controller operatively connected to the single switching transistor in each of the plurality of inverter circuits. The controller is configured to generate a plurality of pulse width modulation (PWM) switching signals, each switching signal in the plurality of switching signals switching the single switching transistor in one of the plurality of inverters at a predetermined frequency, identify a plurality of errors between the voltage level of the AC reference signal from each of the plurality of signal generators and a measured voltage level of an output signal from a corresponding inverter circuit in the plurality of inverter circuits, and set a duty cycle of each of the plurality of PWM switching signals to reduce the identified error in each of the plurality of inverter circuits.

BRIEF DESCRIPTION OF THE DRAWINGS

FIG. 5A is a diagram of a pulse width modulated (PWM) control signal that is generated to control the operation of the circuits of FIG. 1A-FIG. 1E.

FIG. 5B is a diagram of another PWM control signal that is generated to control the operation of the circuits of FIG. 1A-FIG. 1E.

DETAILED DESCRIPTION

Figure 1A:
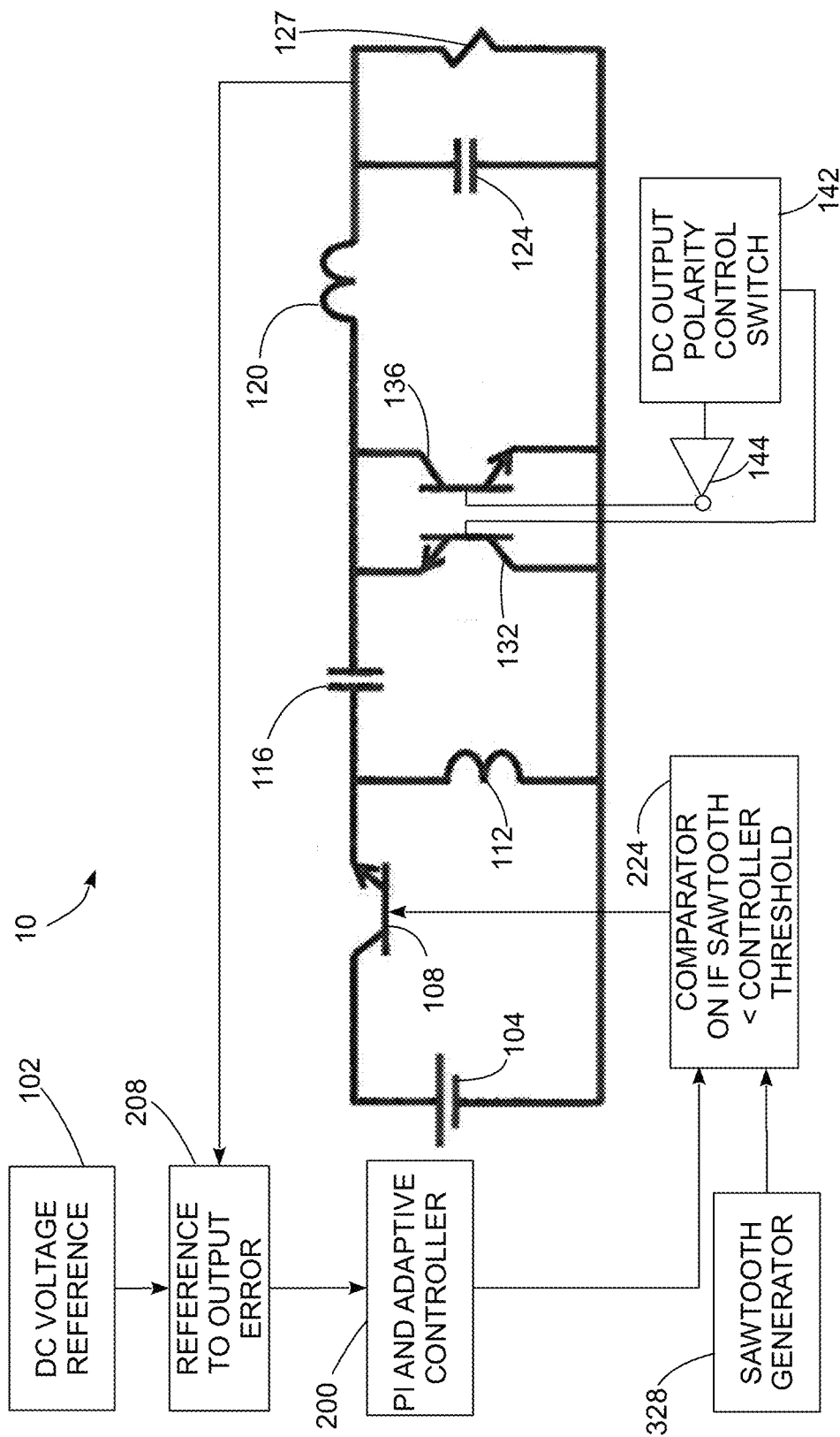
FIG. 1A is a circuit diagram of a DC-to-DC converter with DC output polarity inversion.

For a general understanding of the environment for the system and method disclosed herein as well as the details for the system and method, reference is made to the drawings. In the drawings, like reference numerals have been used throughout to designate like elements.

FIG. 1A depicts a direct current (DC)-to-DC converter circuit 10 that is configured to generate a DC output signal with a voltage that is different than a voltage supplied by a DC electrical power source 104. The DC converter circuit 10 includes a DC power source 104, a single high-frequency switching transistor 108, inductor 112, capacitor 116, switching transistors 132 and 136, inverter 120, capacitor 124, and a DC output load that is represented by resistor 127. A DC polarity control switch 142 and a NOT gate 144 switch the switching transistors 132 and 136 on and off to change a polarity of the output DC signal. The circuit 10 includes a control system for adjusting a duty cycle of the high-frequency transistor 108 to enable the circuit to generate a selected DC output signal. The control system includes a DC voltage reference signal generator 102, a difference feedback circuit 208, a controller 200, and a sawtooth generator 328.

The output of the single switching transistor 108 is electrically connected to an inductor 112 and capacitor 116 in an LC circuit configuration. The output of the LC circuit is applied to a switching device including the switching transistors 132 and 136. The switching transistors 132 and 136 are electrically connected to the DC polarity control switch 142 and NOT gate 144 to form an electrical switching device in the circuit 10. The switching transistors 132 and 136 are arranged in reverse so that one of the transistors is switched off when the other transistor is switched on, which is also referred to as a "synchronous" arrangement. The electrical current from the inductor 112 and capacitor 116 flows through switching transistors 132 and 136 another LC circuit formed by the inductor 120 and capacitor 124 to drive the load 127. The switching transistors 132 and 136 switch the output polarity of the DC signal between a positive and negative polarity (e.g. a +12 volt output or a -12 volt output). While FIG. 1 depicts two transistors 132 and 136, in another embodiment the electrical switching device includes a TRIAC or thyristor is used to reverse the polarity of the output signal. In the example of the circuit 10, a control switch 142 is operatively connected to the transistors 132 and 136, with a NOT gate 144 from the switch 142 being connected to the gate of the transistor 132 to switch the transistor 132 off when the transistor 136 is switched on, and vice-versa. In one embodiment, the DC output polarity control switch 142 is a mechanical switch, and a human operator uses the switch 142 to control the polarity of the DC output signal. In one configuration, the load 127 is a DC motor, and the switch 142 enables an operator to reverse the direction of the DC motor. In another embodiment, a digital control system operates the output polarity switch 142 to select a polarity of the DC output.

In one embodiment of the circuit 10, the DC voltage reference 102, difference circuit 208, controller 200, sawtooth signal generator 328, and comparator 224 are implemented using digital logic circuits. For example, the DC voltage reference generator 102 generates digital data corresponding to a selected DC output voltage level that drives the load 127. In some embodiments the reference signal generator 102 is a reprogrammable digital signal generator that is implemented using a combination of digital processing hardware and software. The signal generator 102 is configured to output data corresponding to a wide range of signal waveforms including different DC voltage levels and AC waveforms. The difference circuit 208 includes one or more analog to digital converters (ADCs) that generate a digital representation of the measured output voltage for the circuit 10. Thus, the DC reference generator 102 is not required to generate an actual voltage output signal that matches the selected voltage output of the circuit 10. Additionally, the sawtooth signal generator 328 and comparator 224 are optionally implemented as digital hardware or software programs that perform the comparison between a digital output value of the threshold value from the controller 200 and the sawtooth signal from the signal generator 328 in software.

The controller 200 includes digital processing hardware, such as a microcontroller, general purpose central processing unit (CPU), digital signal processor (DSP), field programmable gate array (FPGA), application specific integrated circuit (ASIC) to implement the control process. The controller 200 optionally executes software program instructions to implement one or more control processes, and is reconfigurable to use different control processes during different operating modes. For example, while FIG. 1A depicts the controller 200 implementing a combined PI and adaptive control process, in other embodiments the controller 200 implements other closed-loop control processes that enable the circuit 10 to generate an output that accurately tracks the reference signal. For example, any tracking and regulating controller including but not limited to adaptive controllers, self-tuning controllers, variable structure controllers, sliding mode controllers, optimal controllers, robust controllers, model predictive controllers, and their combinations can be used in the same control structure to generate the reference voltage. For example, in one embodiment the controller 200 is an adaptive controller, and in another embodiment the controller 200 is a proportional-integral (PI) controller instead of the hybrid adaptive/PI controller depicted above. In one embodiment, some or all of the functionality in the DC voltage reference generator 102, difference circuit 208, controller 200, sawtooth signal generator 328, and comparator 224 are integrated in a system on a chip (SoC) digital logic component.

The difference circuit 208 identifies a voltage difference between the DC reference from the signal generator 102 and a DC output level of the circuit 10 measured at the load 127. The voltage difference corresponds to an error between the reference DC voltage level and the actual output DC voltage from the circuit 10. The controller 200, which is a combined proportional-integral and adaptive controller 200 in FIG. 1A, receives the identified error and adjusts a level of a pulse-width-modulation threshold that is applied in comparator 224 to the output of sawtooth signal generator 328 to adjust the corresponding duty cycle of the high-frequency switching transistor 108. A comparator 224 compares the output of the sawtooth generator 328 to the output of the controller 200, and generates a signal for the gate of the transistor 108 to turn the transistor 108 on only when the output of the sawtooth signal generator 328 is below the threshold value output from the controller 200. The high-frequency transistor 108 switches on and off with varying duty cycles to apply the DC power source 104 to the LC circuit in a selective manner to maintain a DC output at a consistent level. In particular, when the high-frequency transistor 108 is switched "on" the DC power source 104 is electrically connected to the LC circuit, and when the high-frequency transistor 108 is switched "off" the DC power source 104 is disconnected from the LC circuit. The DC output voltage is different than the DC voltage supplied by the DC power source 104, and the controller 200 adjusts a cutoff threshold in the comparator 224 to control the operation of the high-frequency transistor 108 to reduce or eliminate the error between the output DC signal from the circuit 10 and the reference signal from the reference signal generator 102.

As depicted in FIG. 5A and FIG. 5B, the sawtooth generator 328 generates a sawtooth signal 502 at a predetermined frequency, such as a frequency in a range of 2 KHz to 20 KHz, which switches the high-frequency switching transistor 108 on and off at the sawtooth frequency. The frequency from the sawtooth generator 328 for the single switching transistor 108 is substantially higher than an output frequency of the circuit 10 to enable the controller 200 to adjust the delivery of electrical power from the DC source 104 to the circuit 10 to track the DC output from the reference signal generator 102 accurately. Thus, the switching transistor 108 is also referred to as a "high-frequency" switching transistor. The duty cycle refers to a proportion of each cycle of the sawtooth signal for which the high-frequency switching transistor 108 is activated to enable current from the DC source 104 to flow to the rest of the circuit 10, or deactivated to disconnect the DC source 104 from the rest of the circuit 10. In FIG. 5A, the controller 200 sets a lower duty cycle threshold 506, and the comparator 224 switches the transistor 108 on during the periods 504, while the transistor 108 is switched off during the remaining portions of each cycle of the sawtooth signal 502. In FIG. 5B, the controller 200 generates a higher threshold 510 for a higher corresponding duty cycle. The comparator 224 switches on the transistor 108 for longer periods 508 during each cycle of the sawtooth signal 502. As described in more detail below, the controller 200 increases and decreases the output threshold to adjust the duty cycle of the high-frequency switching transistor 108 to maintain an output signal from the circuit 10 that corresponds to the reference signal and adjusts for variations in the output of the DC source 104 and characteristics of the load 127.

Figure 6A:
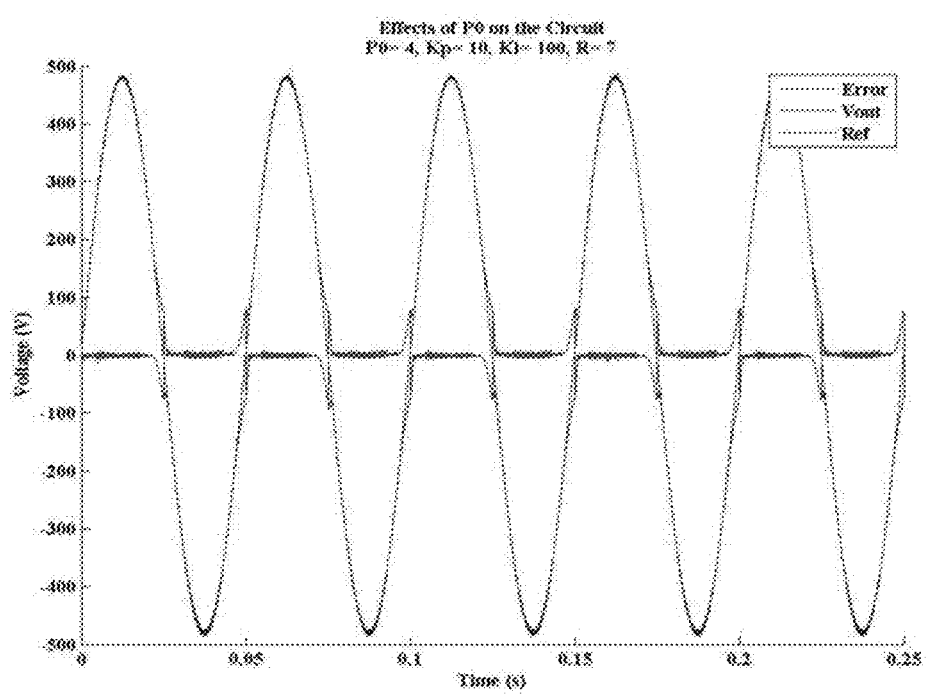
FIG. 6A is a graph of a sinusoidal AC waveform generated by the inverter system of FIG. 3 and error between the generated AC waveform and a reference waveform at a load of 32.9 kW.
Figure 6B:
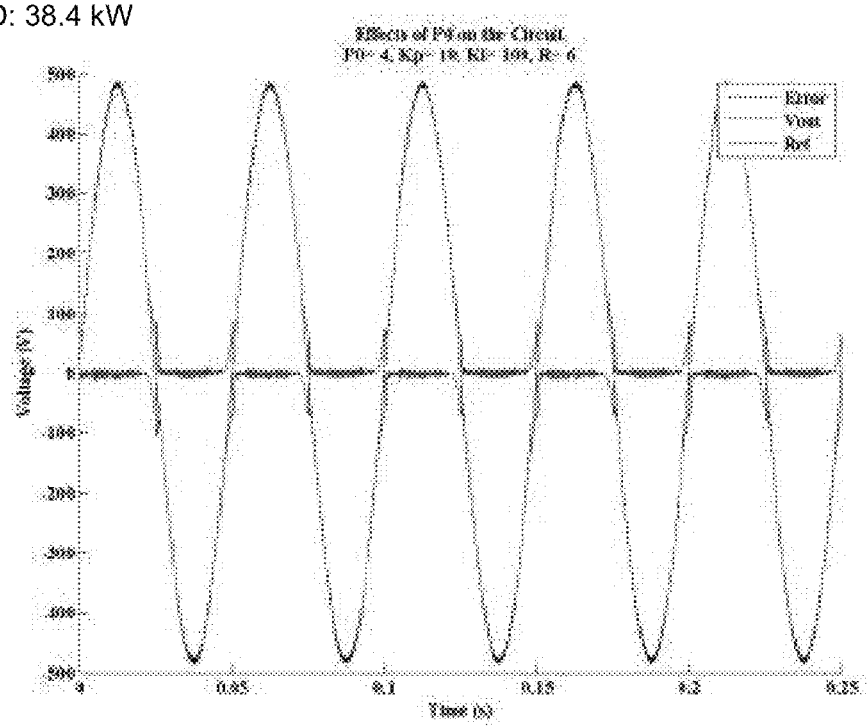
FIG. 6B is a graph of a sinusoidal AC waveform generated by the inverter system of FIG. 3 and error between the generated AC waveform and a reference waveform at a load of 38.4 kW.
Figure 6C:
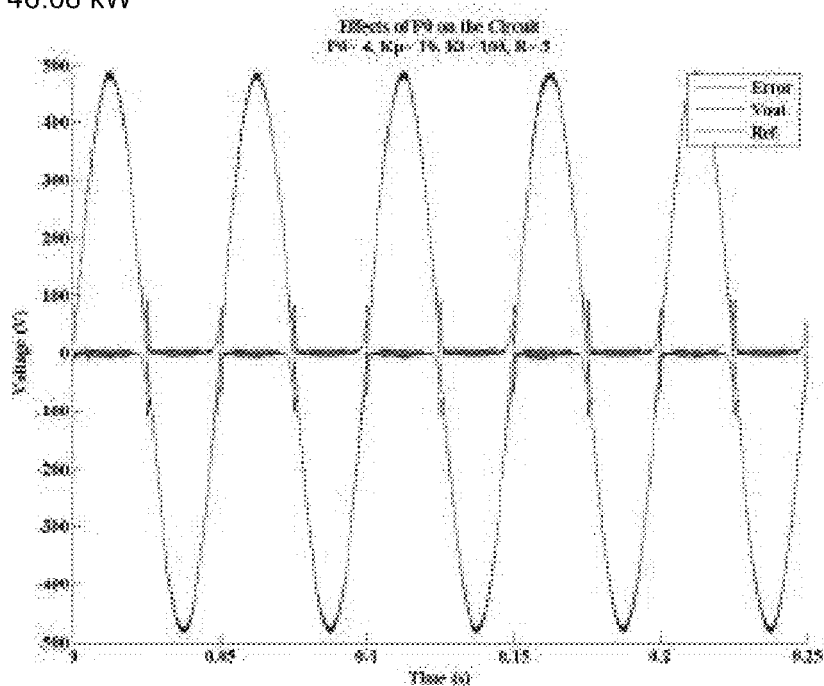
FIG. 6C is a graph of a sinusoidal AC waveform generated by the inverter system of FIG. 3 and error between the generated AC waveform and a reference waveform at a load of 46.08 kW.
Figure 6D:
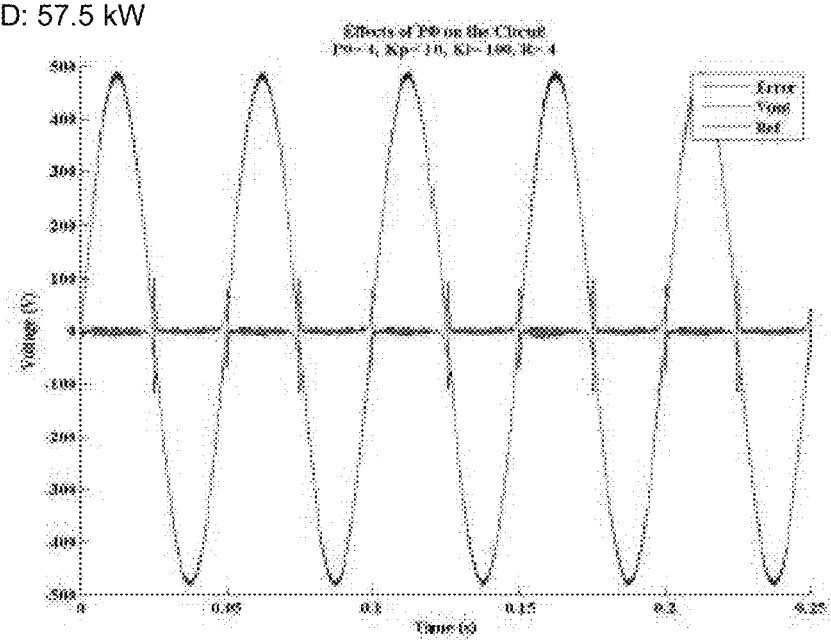
FIG. 6D is a graph of a sinusoidal AC waveform generated by the inverter system of FIG. 3 and error between the generated AC waveform and a reference waveform at a load of 57.05 kW.
Figure 6E:
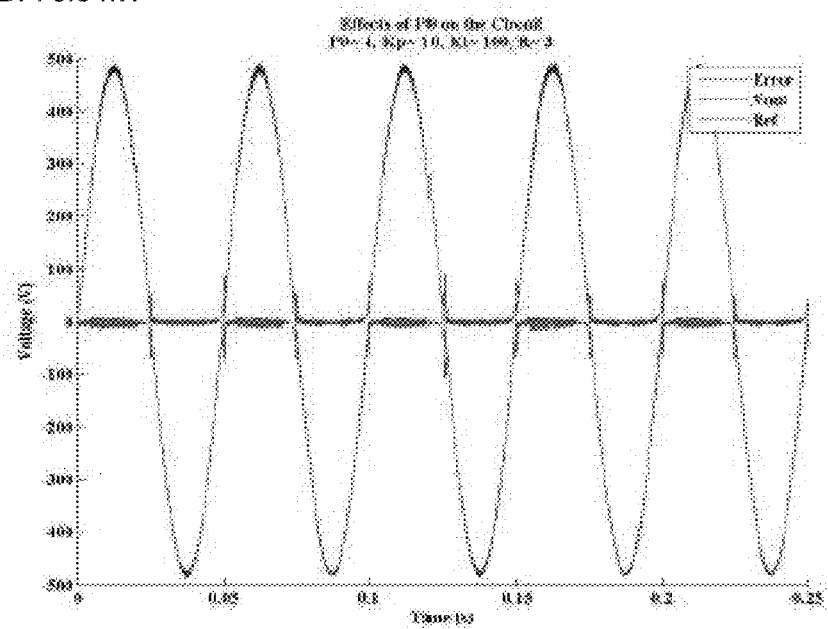
FIG. 6E is a graph of a sinusoidal AC waveform generated by the inverter system of FIG. 3 and error between the generated AC waveform and a reference waveform at a load of 76.8 kW.
Figure 6F:
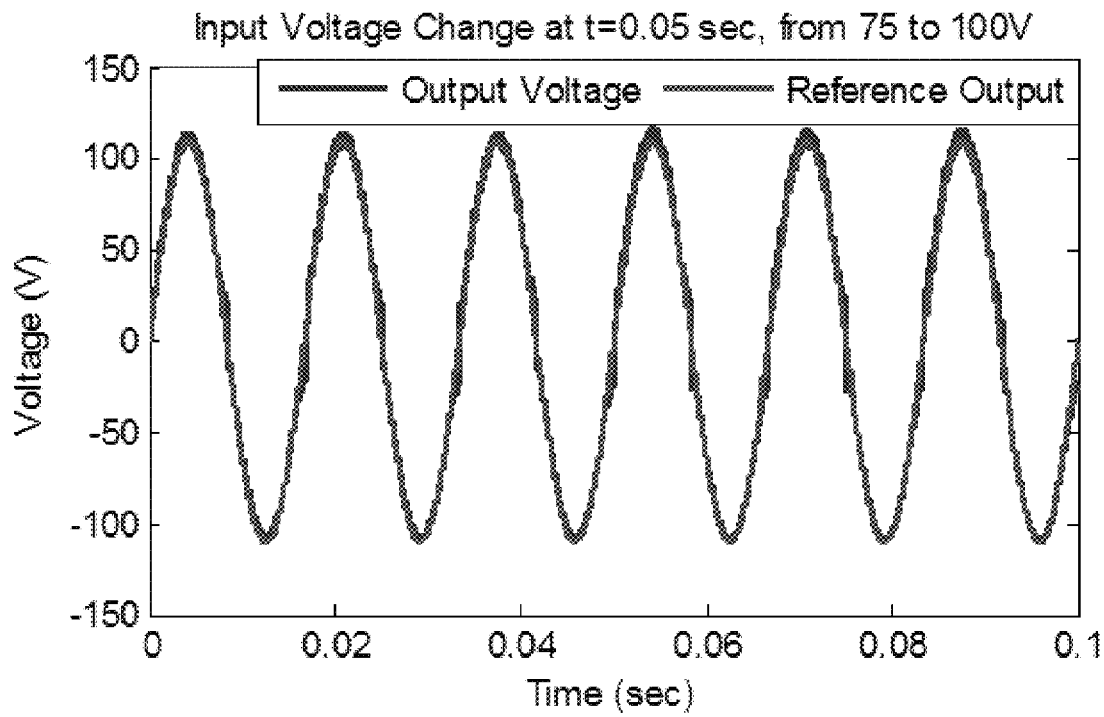
FIG. 6F is a graph of a sinusoidal AC waveform generated by the inverter system of FIG. 3 and error between the generated AC waveform and a reference waveform when the magnitude of a DC source to the inverter changes during operation.
Figure 6G:
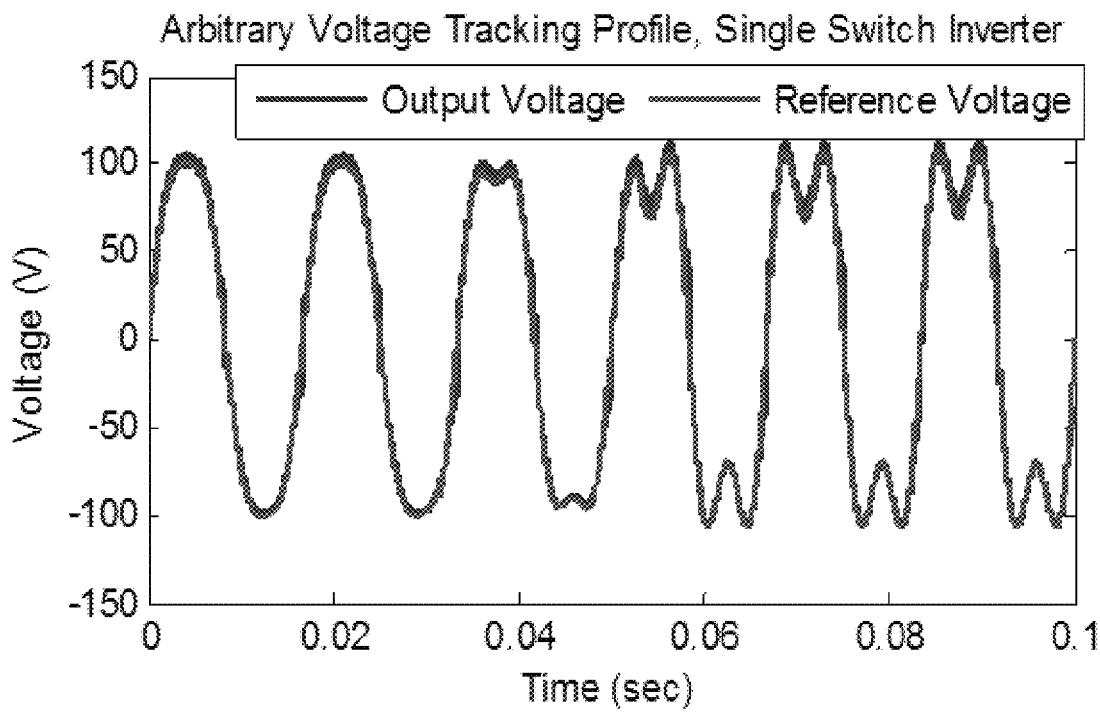
FIG. 6G is a graph of an AC output waveform generated by the inverter system of FIG. 3 that tracks an arbitrarily changing reference signal.
Figure 6H:
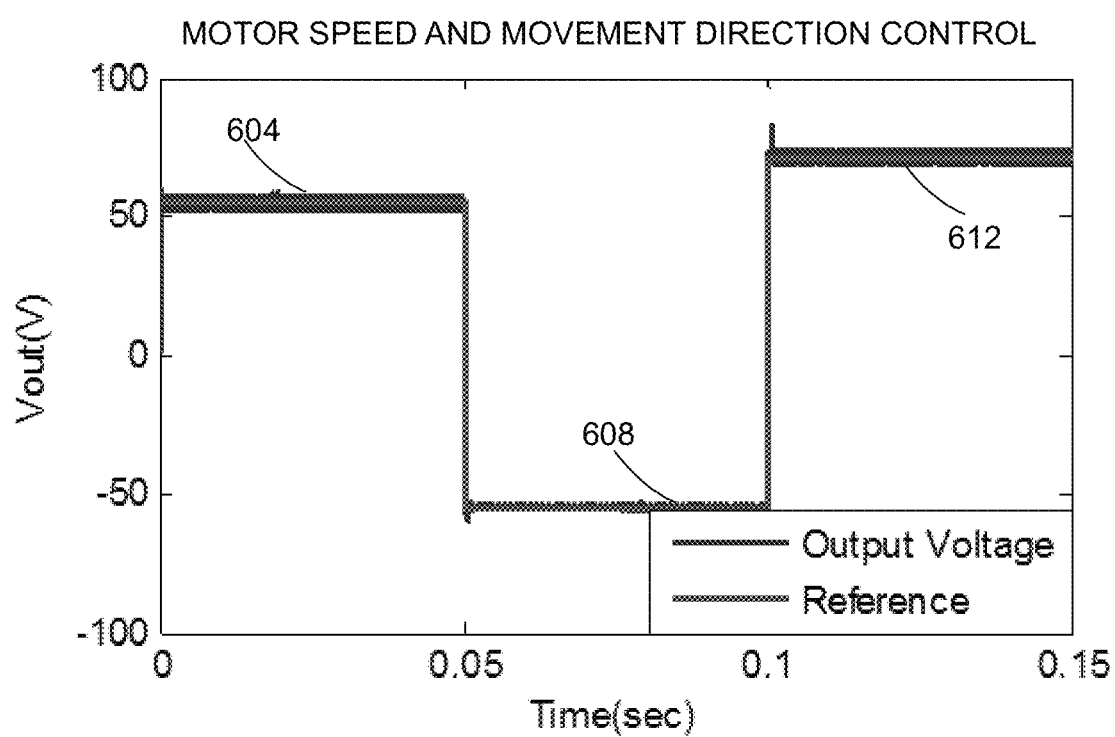
FIG. 6H is a graph of a control output waveform that the inverter system of FIG. 3 generates to control the direction and speed of a DC motor.

FIG. 6H depicts an output of the circuit 10 in FIG. 1A in a configuration where the circuit 10 drives a DC motor load that moves in two different directions at multiple speeds in response to receiving different drive voltages. In FIG. 6H, the circuit 10 generates an output of approximately +50 volts that tracks a reference voltage value of +50 volts as depicted by the waveform component 604. The polarity switch is 142 is switched during the time corresponding to the waveform component 608, and the circuit 10 continues to generate an output with a magnitude of 50 volts, but with a negative polarity instead of a positive polarity. During the time corresponding to the waveform component 612, the polarity switch 142 is reversed again and the circuit outputs a positive polarity signal. The reference signal generator also increases the magnitude of the reference to 60V from 50V. The controller 200 in the circuit 10 adjusts the operation of the high-frequency transistor 108 to track the higher reference signal voltage. The circuit 10 generates the output voltages depicted in FIG. 6H using a DC voltage source that provides voltage at a different level than the output signals. For example, in one embodiment the input DC power source 104 provides a 100 volt DC input, and the circuit 10 generates different levels of DC output.

The circuit 10 includes the switching transistors 132 and 136 under the control of the DC output polarity control switch 142 to enable generation of DC output signals with both positive and negative polarities. In another embodiment, however, the circuit 10 is only configured to output positive or negative voltages without the need for switching between the positive and negative outputs. The alternative embodiment omits the polarity control switch 142 and NOT gate 144, and replaces the switching transistors 132 and 136 with a single diode that is electrically connected between the capacitor 116/inductor 120 junction and the inductor 112/capacitor 124 junction in the same manner as the transistors 132 and 136 in FIG. 1A. To generate positive voltage outputs, the cathode of the diode is electrically connected to the capacitor 116/inductor 120 junction, and the anode is electrically connected to the inductor 112/capacitor 124 junction. To generate negative voltage outputs, the anode of the diode is electrically connected to the capacitor 116/inductor 120 junction, and the cathode is electrically connected to the inductor 112/capacitor 124 junction.

As described in more detail below, the components in the circuit 10, including the adaptive controller 200, can be used in generation of more complex output signals from a DC electrical power source. The reference signal generator 102 generates a DC reference voltage in the circuit 10, but alternative signal generator configurations, including reprogrammable digital signal generators, produce a wide range of reference signals. The controller 200 tracks the error between the reference signal and the circuit output to adjust the threshold of the sawtooth signal generator 328 and high-frequency transistor 108, which adjusts the output signal of the circuit 10 to track the reference signal. The switching transistors 132 and 136 or another electrical switching device such as a TRIAC or thyristor switch at the predetermined frequency of the output AC waveform to reverse the polarity of the output for generation of the positive and negative portions of the AC waveform. Examples of outputs include sinusoidal alternating current (AC) electrical power outputs at a wide range of frequencies including 50 Hz and 60 Hz outputs, square wave outputs, triangle wave outputs, non-uniform wave outputs, and the like.

Figure 1B:
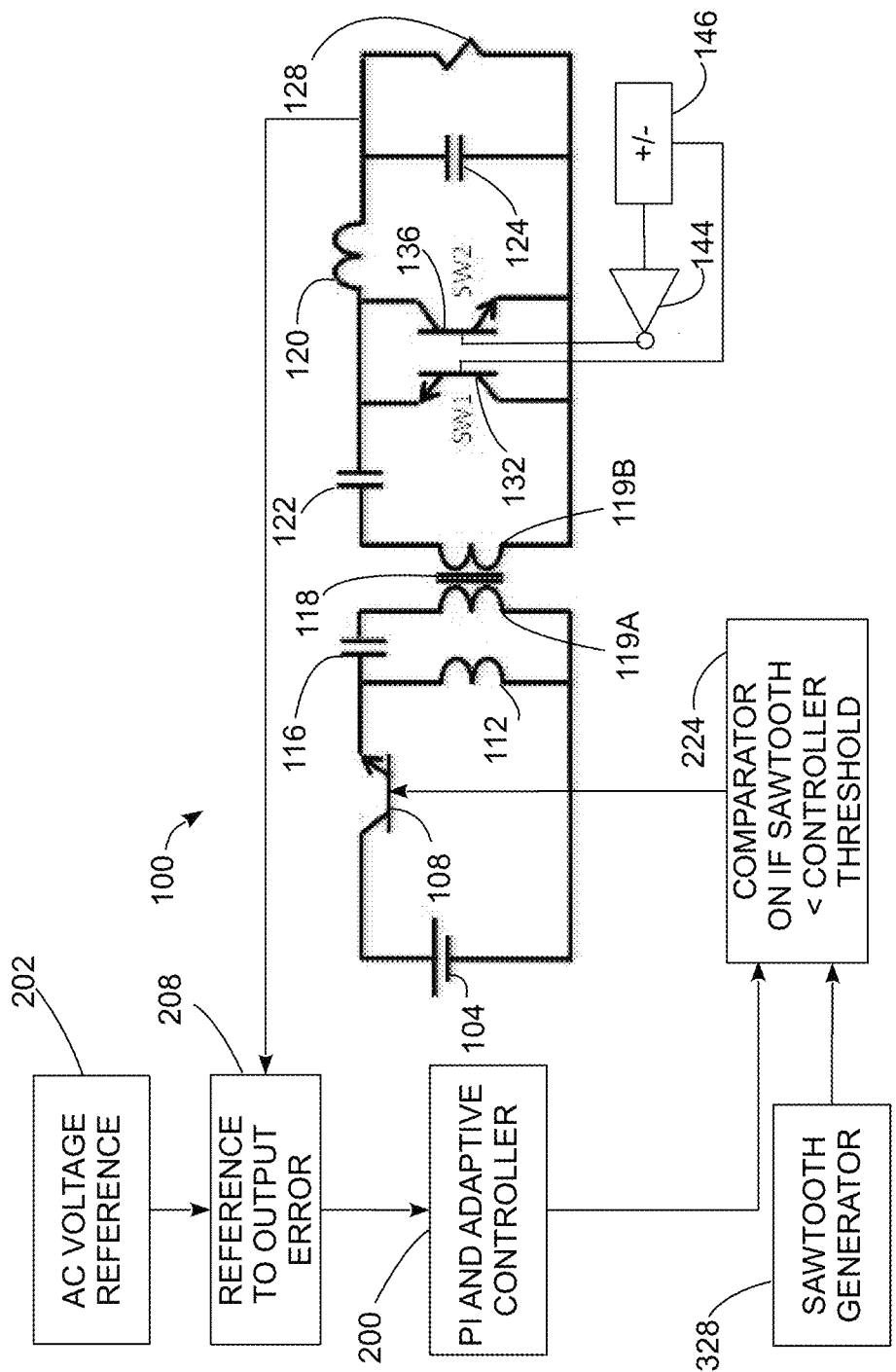
FIG. 1B is a circuit diagram of an inverter including a single high-frequency switching transistor and an isolation transformer.

FIG. 1B depicts an inverter circuit 100 that is used for generation of an alternating current (AC) output signal from a direct current (DC) input signal when incorporated with an adaptive inverter system 200 that is described in more detail below. The inverter circuit 100 includes many of the same components that are used in the DC-to-DC converter circuit 10. In the inverter circuit 100, the reference signal generator 202 generates an AC reference signal, and the controller 200 is configured to adjust the duty cycle of the high-frequency switching transistor 108 to track the AC signal waveform instead of a constant DC output waveform. The inverter circuit 100 is coupled to a DC power source 104. A single high-frequency switching transistor 108 is connected to an output of the DC power source 104. The output of the transistor 108 is electrically connected to an inductor 112 and capacitor 116 in an LC circuit configuration. As described in more detail below, the high-frequency transistor is switched on and off to selectively apply the DC power source 104 to the LC circuit to maintain a consistent AC output signal. In particular, when the high-frequency transistor 108 is switched "on" the DC power source 104 is electrically connected to the LC circuit, and when the high-frequency transistor 108 is switched "off" the DC power source 104 is disconnected from the LC circuit.

The output of the LC circuit is applied to synchronous switching transistors 132 and 136. The switching transistors 132 and 136 are arranged in reverse so that one of the transistors is switched off when the other transistor is switched on. The switching transistors 132 and 136 are referred to as "synchronous" switching transistors because they are both switched at a predetermined frequency to select the polarity of current flow and generate AC output signal waveforms. In the different circuit embodiments described below, the synchronous switching transistors 132 and 136 are connected in the reversed source/drain configuration and operated with synchronous gate control signals so that only one of the switching transistors 132 and 136 is switched on at any one time.

Figure 1C:
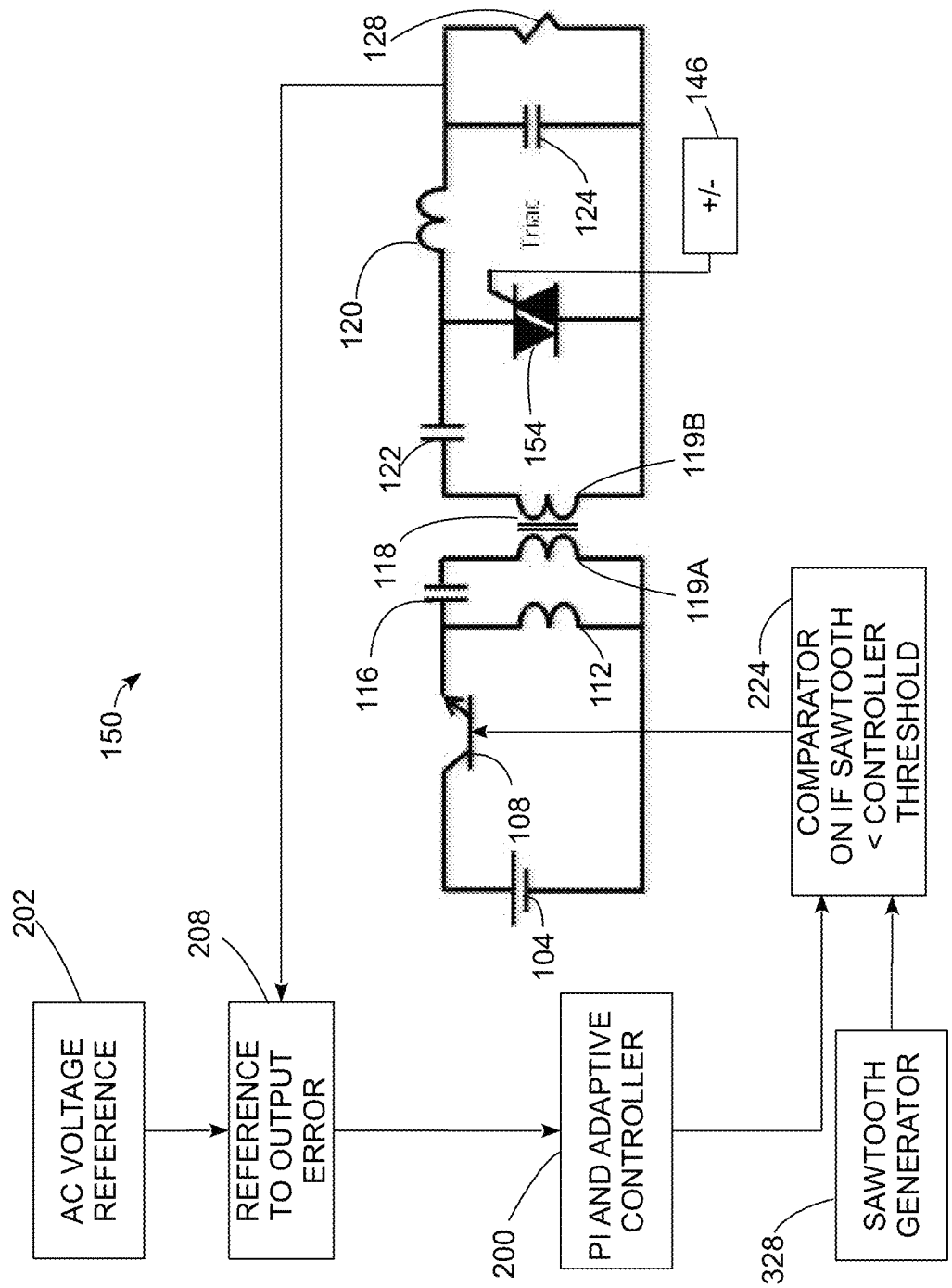
FIG. 1C is a circuit diagram of another inverter including a single high-frequency switching transistor and an isolation transformer.

In FIG. 1B, a NOT gate 144 and sign generator 146 corresponding to the sign of a reference waveform alternate the switching transistors 132 and 136 so that one of the transistors is on when the other transistor is off. The sign generator 146, NOT gate 144, and the synchronous transistors 132 and 136 form an electrical switching device in the circuit 100 that switches the polarity of the AC output signal between positive and negative output polarities at the predetermined frequency of the AC output signal, such as 50 Hz or 60 Hz in electrical power generation applications. In FIG. 1C, the sign generator 146 is operatively connected to the gate of the TRIAC 154 through a commercially available driver circuit that sets the direction of current flow through the TRIAC 154. The sign generator 146 produces either a logical "low" (e.g. 0 volt) or logic "high" (e.g. 5 or 15 volt) output signal to drive the switching transistors 132 and 136, with the switching transistors 136 being driven through the NOT gate 144. The sign generator 146 produces the low or high output with reference to the sign (greater than or less than zero) of a reference waveform from an external reference signal generator that is described in more detail below. For example, when the reference signal is a 50 Hz or 60 Hz waveform, the synchronous switching transistors 132 and 136 switch on and off at the desired AC output frequency of 50 Hz or 60 Hz and other desired frequencies or their combinations. In the configuration of the inverter circuit 100, the output voltage is positive when synchronous switching transistor 132 is switched on and the output voltage is negative when the synchronous switching transistor 136 is switched on.

In FIG. 1B and FIG. 1C, an input of a transformer 118 is electrically connected to the output of the transistor 108 through the LC circuit including inductor 112 and capacitor 116. In FIG. 1B, the output of the transformer 118 is electrically connected to the synchronous switching transistors 132 and 136 through another capacitor 122. In FIG. 1C, the output of the transformer 118 is electrically connected to the TRIAC 154 through the capacitor 122. The transformer 118 isolates the DC power source 104 from the output load 128. Additionally, the transformer can be configured to increase or "step up" the output voltage. The transformer 118 includes a primary winding 119A and a secondary winding 119B, which correspond to isolated primary and secondary sides, respectively, of the transformer 118. The primary winding 119A and secondary winding 119B both act as inductors. As is known in the art, the ratio of the number turns in each of the windings 119A and 119B affects the voltage ratio between the primary and secondary sides of the transformer 118.

In the inverter circuits 100 and 150, the capacitor and inductor component values on the primary and secondary sides of the transformer 118 are selected to produce two inductor-capacitor (LC) circuits with substantially equivalent resonant frequencies. Since the primary winding 119A is connected in series with the inductor 112, the individual values of the inductors are added together to form a combined primary loop inductance $L_P$. The inductors 119A and 112 form an LC circuit with capacitor 116 with a combined value of $L_P C_P$, where $C_P$ is the capacitance value of the capacitor 116. On the secondary side, the secondary inductor 119B forms another LC circuit with the capacitor 122. The secondary LC circuit has a combined inductance-capacitance value of $L_S C_S$ where $L_S$ is the inductance of the secondary winding 119B and $C_S$ is the capacitance of the capacitor 122. As is known in the art, an LC circuit resonates at a resonant frequency $$\omega = \frac{1}{\sqrt{LC}}.$$

While the particular inductance and capacitance values in the primary and secondary LC circuits can vary in different embodiments of the circuit 100, the total values of $L_P C_P$ and $L_S C_S$, and corresponding resonant frequencies $\omega_P$ and $\omega_S$, are substantially equal so that the transformer 118 transfers energy between the primary side and secondary side in an efficient manner.

In FIG. 1B, the outputs of the synchronous switching transistors 132 and 136 are electrically connected to an output load 128 via inductor 120 and capacitor 124. The output load 128 is represented schematically as a resistor that presents an impedance to the AC output signal, but the load can include both inductive and capacitive components, and the load 128 can vary over time. Additionally, the characteristics of the components in the inverter 100 can change over time due to environmental factors, such as changes in operating temperature, or due to the operational age of components in the inverter 100. As described below, the circuit 100 is incorporated in an inverter system 300 that controls the operation of the high-frequency transistor 108 and synchronous switching transistors 132 and 136 to provide a consistent AC output signal for varying waveforms, input source voltages, output loads, and changes in the characteristics of the inverter 100.

FIG. 1C depicts another inverter circuit 150 that is used for generation of an alternating current (AC) output signal from a direct current (DC) input signal when incorporated with an adaptive inverter system 200 that is described in more detail below. The inverter circuit 150 of FIG. 1C is similar to the inverter circuit 100 of FIG. 1B, but the synchronous switching transistors 132 and 136 from FIG. 1B are replaced with a single triode for alternating current (TRIAC) 154, which can also be modeled as two thyristors. The TRIAC 154 switches between a positive and negative output at the desired AC output frequency in a similar manner to the synchronous switching transistors 132 and 136 in FIG. 1B. In one configuration, the use of the TRIAC or thyristors enables more efficient operation when the inverter 150 is configured to produce an output signal with comparatively low output amplitude, while the switching transistors in the example of the inverter 100 are used for higher power outputs. The inverters of FIG. 1B and FIG. 1C are a form of a buck-boost inverter with polarity change capability. Similar inverters to the configurations of FIG. 1B and FIG. 1C are known for changing the output voltage and/or inverting the output of a DC signal in a DC-DC converter configuration.

In the inverter circuits 100 and 150, the high-frequency transistor 108 switches on and off at a predetermined frequency under control of a pulse width modulation (PWM) signal that selects the proportion of time that the transistor 108 is switched on during each cycle of the frequency. When the switching transistor 108 is switched on, an electric current flows from the DC power source 104 into the LC circuit including the inductors 112 and 119A and capacitor 116. As is known in the art, the LC circuit stores energy from the DC source 104 in the form of a magnetic field in the inductors and an electric field in the capacitor. When the high-frequency transistor 108 is switched off, the DC power source 104 is disconnected from the inverter circuit, and a current resonates in the LC circuit with inductors 112 and 119A and capacitor 116. The resonating current in the LC circuit transfers through the transformer 118 to the second-side LC circuit and subsequently to the load 128 as a portion of the AC output waveform. As described below, a controller 200 adjusts the duty cycle of the signal applied to the high-frequency transistor 108 to enable generation of a wide range of AC signals that remain stable during variation of the DC source or load impedance.

Figure 1D:
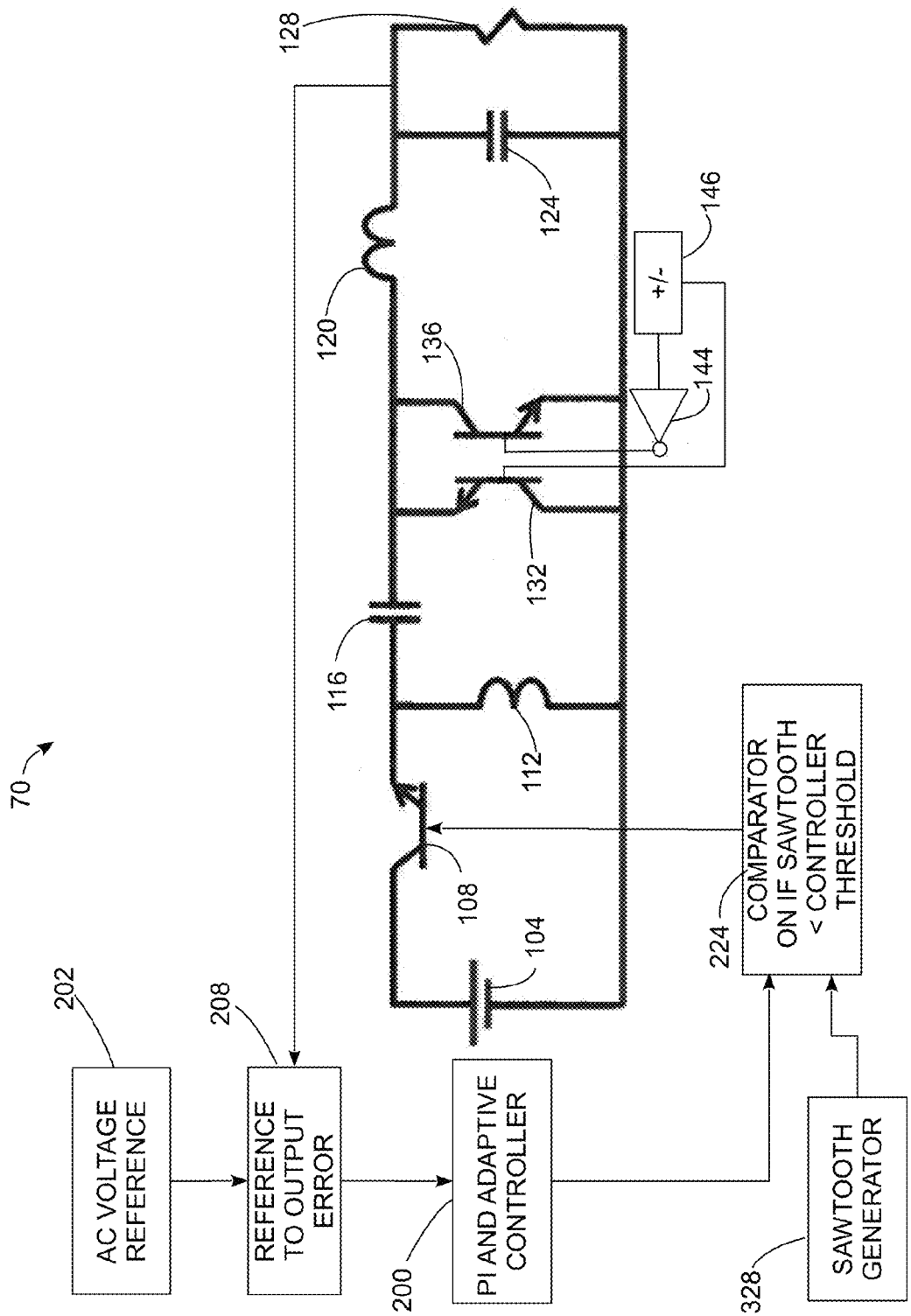
FIG. 1D is a circuit diagram of another inverter with a single high-frequency switching transistor and without an isolation transformer.
Figure 1E:
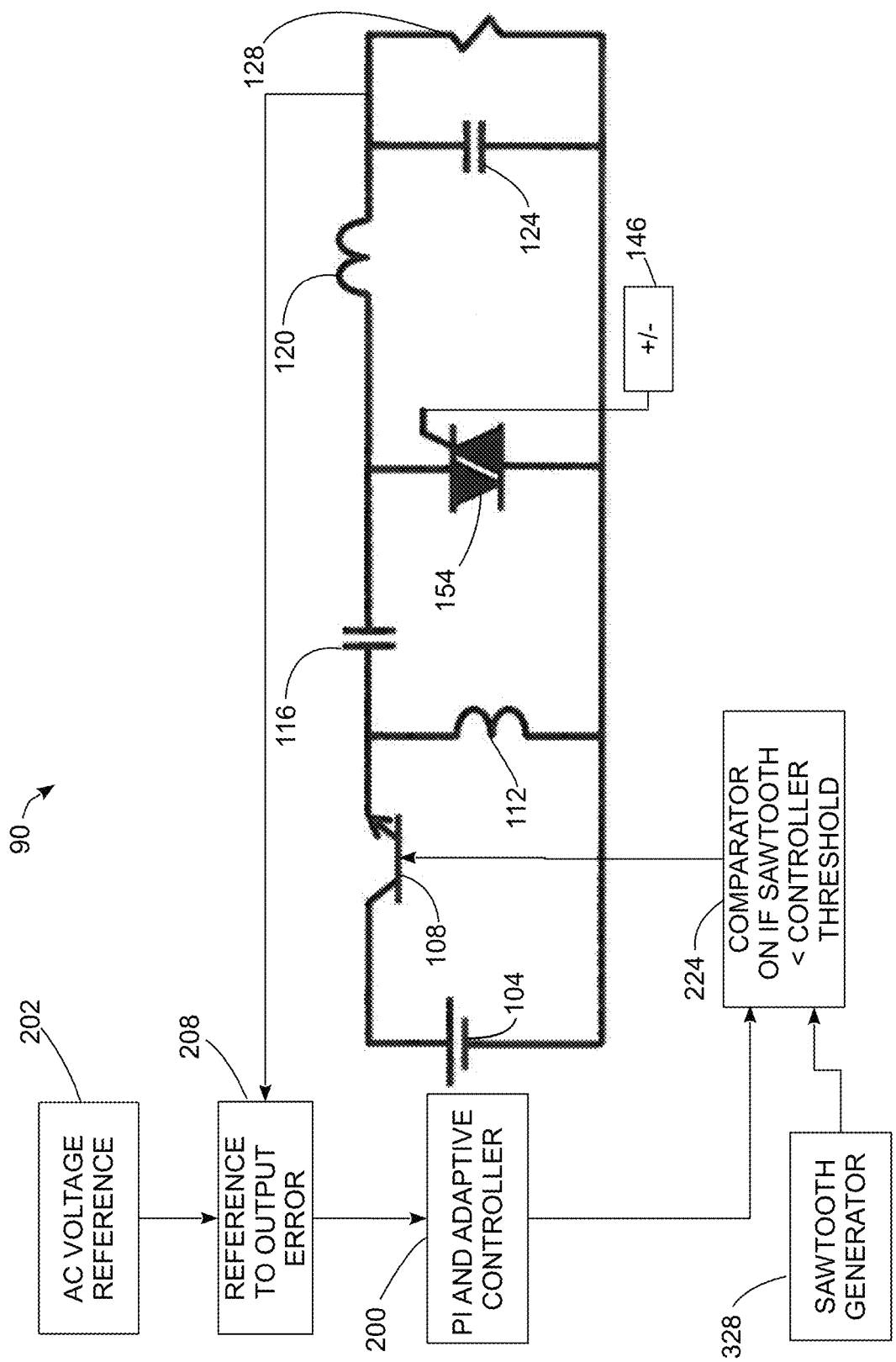
FIG. 1E is a circuit diagram of another inverter with a single high-frequency switching transistor and without an isolation transformer.

FIGS. 1D and 1E depict embodiments of inverter circuits that omit the isolation transformer 118 and capacitor 122 that are included in the inverter circuits 100 and 150. FIG. 1D depicts an inverter circuit 70 including the switching transistors 132 and 136 that are electrically connected to the capacitor 116 and inductor 112. FIG. 1E depicts an inverter circuit 90 including a TRIAC 154 that is connected to the inductor 112 and capacitor 116. Both embodiments of the circuits 70 and 90 generate an AC output signal from a DC power source 104 using the controller 200 to adjust the duty cycle of the PWM signal that operates the high-frequency switching transistor 108 as described above. In the circuit 70, the synchronized switching transistors 132 and 136 reverse the polarity of the output AC waveform at the predetermined output frequency for the AC waveform, such as 50 Hz or 60 Hz. In the circuit 90, the TRIAC 154 reverses the polarity of the output AC waveform at the predetermined output frequency.

Figure 7A:
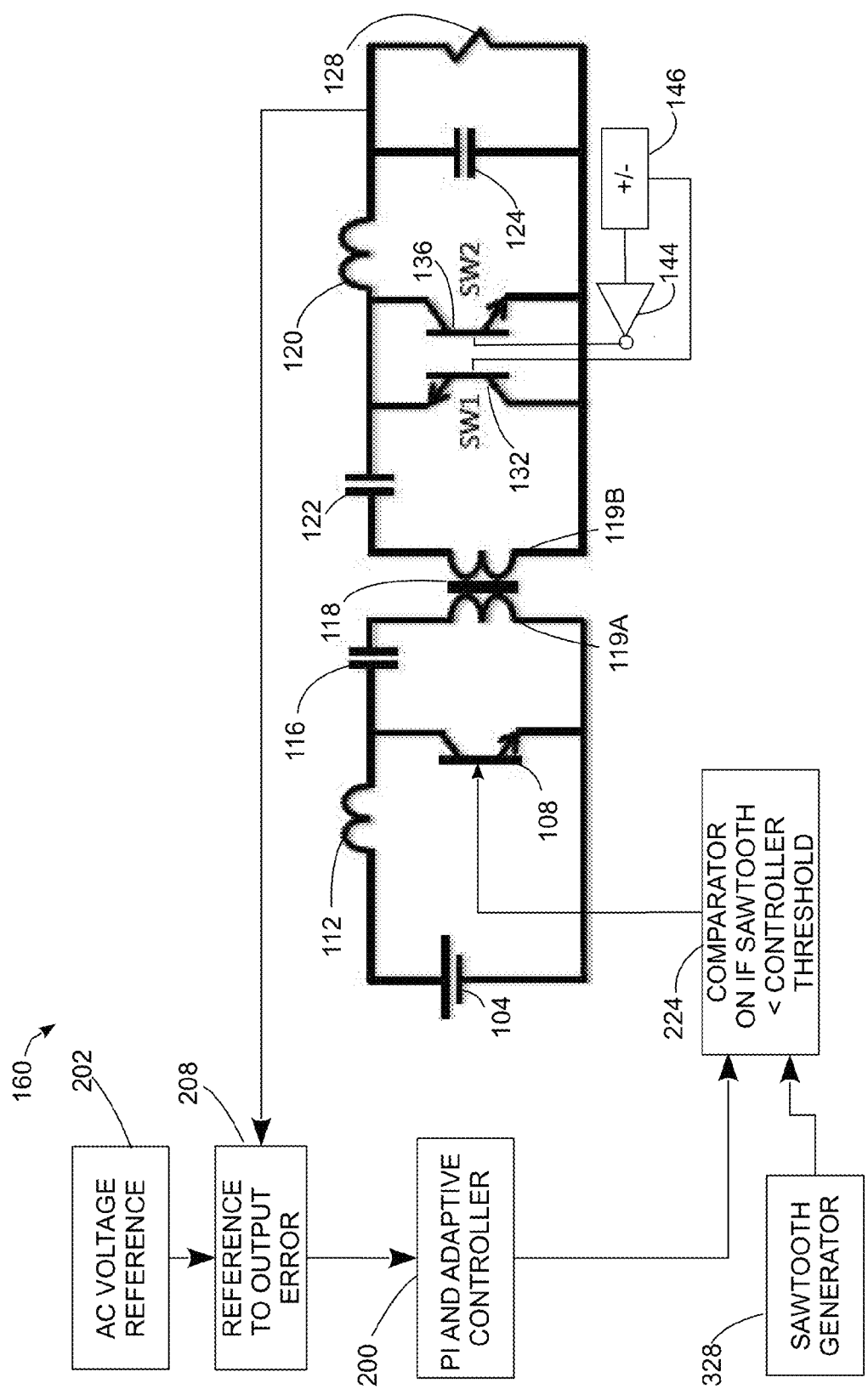
FIG. 7A is a circuit diagram of another configuration of the inverter of FIG. 1A including a single high-frequency switching transistor and an isolation transformer.
Figure 7B:
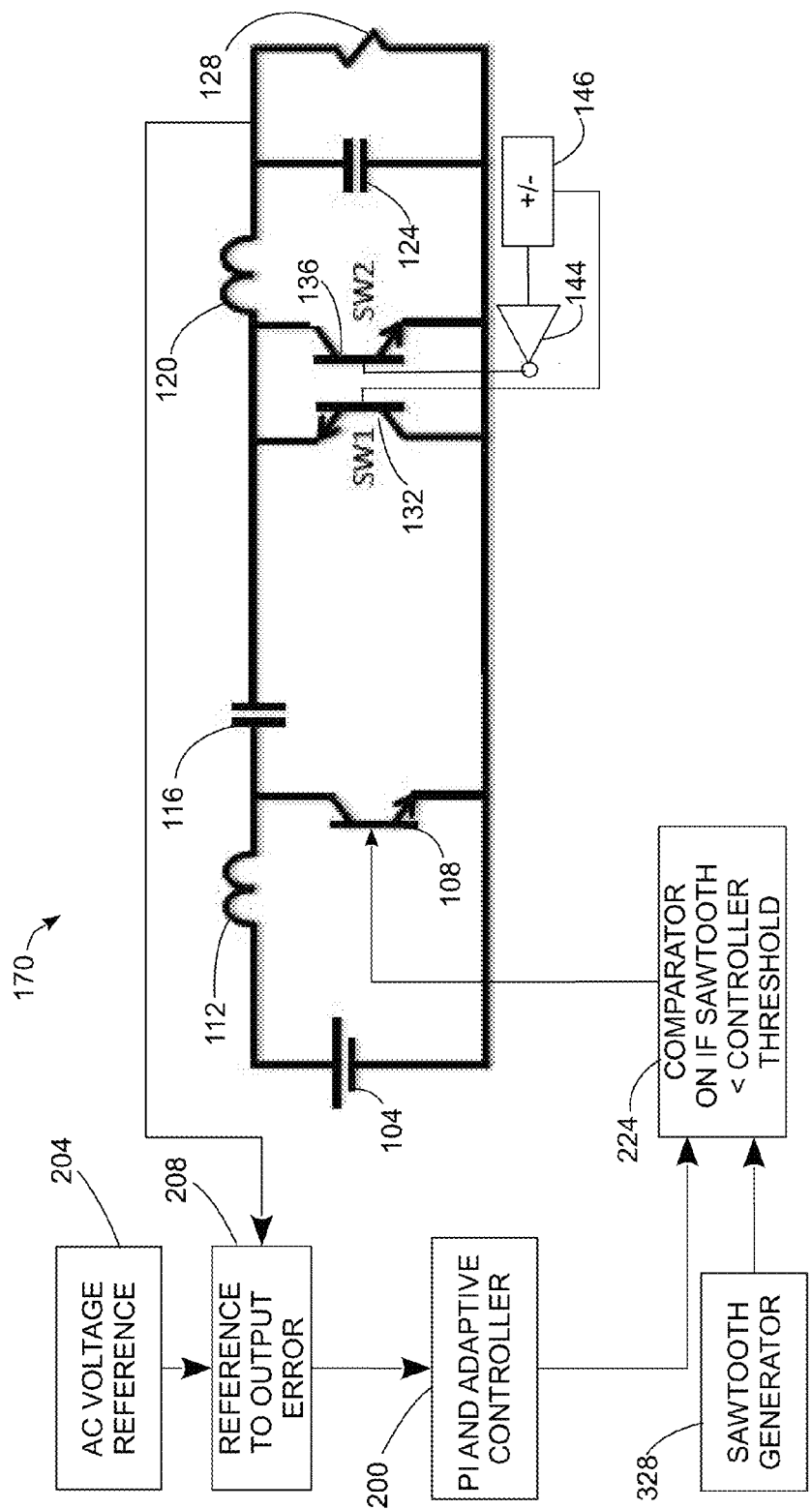
FIG. 7B is a circuit diagram of another configuration of the inverter of FIG. 7A that omits the isolation transformer.

FIG. 7A and FIG. 7B depict two alternate configurations of the circuit 100 from FIG. 1B. FIG. 7A depicts a circuit 160 in which the inductor 112 is connected to the positive terminal of the DC power source 104 and the drain of the high-frequency transistor 108. The drain of the high-frequency transistor 108 is also connected to the capacitor 116, and the source of the high-frequency transistor 108 is connected to the negative terminal of the DC power source 104. The isolation transformer 118 provides improved safety and enables the circuit 160 to generate an AC output at higher power levels.

FIG. 7B depicts a similar circuit 170 that omits the transformer 118 and capacitor 122. In the circuit 170, the inductor 112 is connected to the positive terminal of the DC power source 104 and the drain of the high-frequency transistor 108. In the circuit 170, the drain of the high-frequency transistor 108 is also connected to the capacitor 116, and the source of the high-frequency transistor 108 is connected to the negative terminal of the DC power source 104. In FIG. 7B, the capacitor 116 is connected directly to the inductor 120 and synchronous switching transistors 132 and 136. The non-isolated circuit 170 in FIG. 7B is used for generating an AC output at lower power levels. In an alternative configuration, the synchronous switching transistors 132 and 136 in the circuits 160 and 170 are replaced by a TRIAC or thyristors.

Figure 8A:
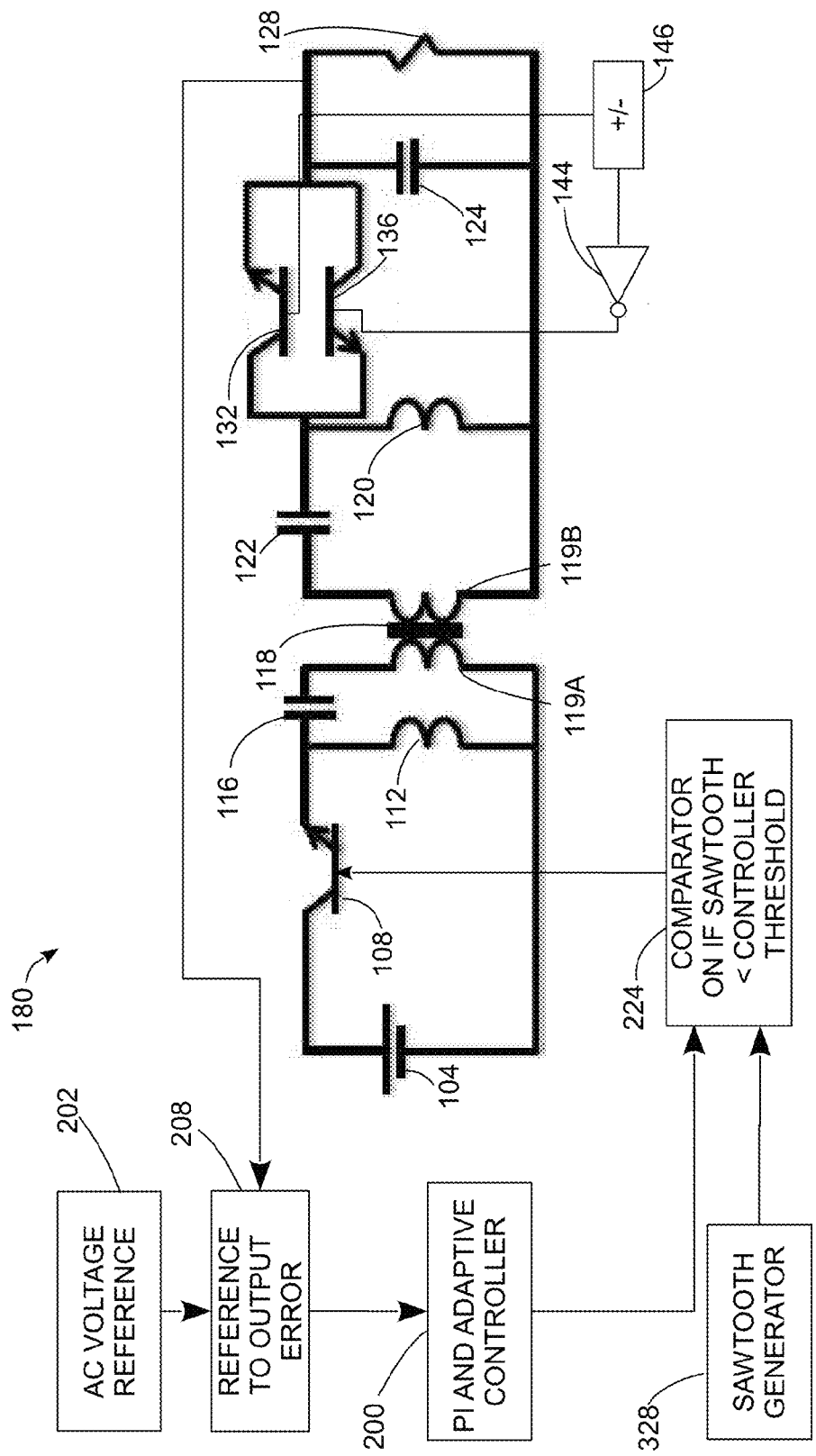
FIG. 8A is a circuit diagram of another configuration of the inverter of FIG. 1 including a single high-frequency switching transistor and an isolation transformer.
Figure 8B:
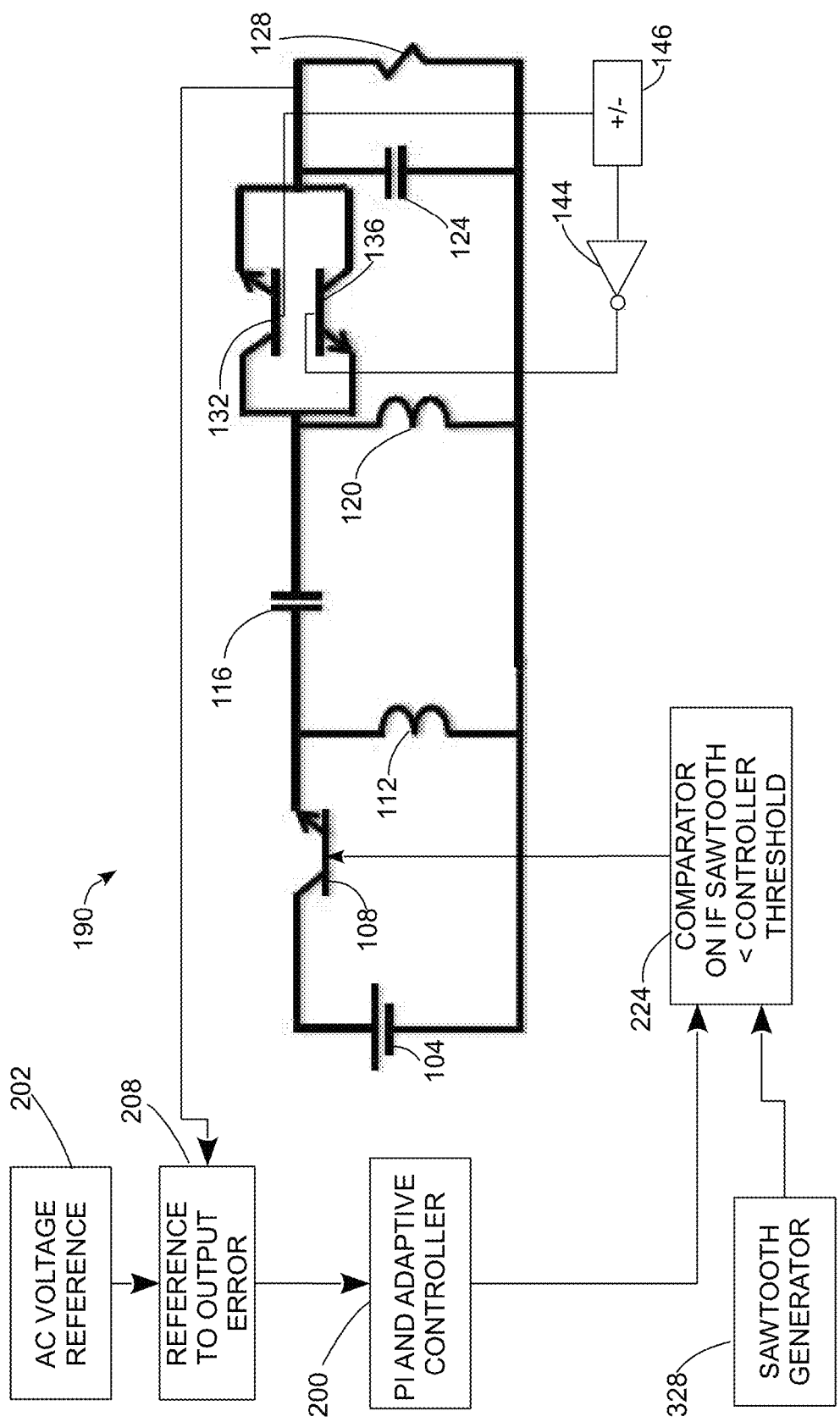
FIG. 8B is a circuit diagram of another configuration of the inverter of FIG. 8A that omits the isolation transformer.

FIG. 8A and FIG. 8B depict another two alternate configurations of the circuit 100 from FIG. 1B. FIG. 8A depicts a circuit 180 in which the synchronous switching transistors 132 and 136 are connected in series between the inductor 120/capacitor 122 junction and the capacitor 124. The synchronous switching transistors 132 and 136 remain connected in parallel with each other with the source of transistor 132 being connected to the drain of transistor 136, and vice-versa. FIG. 8B depicts a similar circuit 190 that omits the transformer 118 and capacitor 122, with the switching transistors 132 and 136 being connected in series between the inductor 120/capacitor 116 junction and the capacitor 124. The isolation transformer 118 provides improved safety and enables the circuit 160 to generate an AC output at higher power levels.

In FIG. 8B, the capacitor 116 is connected directly to the inductor 120 and synchronous switching transistors 132 and 136. In an alternative configuration, the switching transistors 132 and 136 in the circuits 180 and 190 are replaced by a TRIAC or thyristors. The non-isolated circuit 190 in FIG. 8B is used for generating an AC output at lower power levels.

The configurations of the circuits 160-190 improve the operation of various aspects of the inverter circuit. The circuits 160 and 170 reduce the stress on the high-frequency transistor 108 and provide improved inverter performance. In the circuit 160, the configuration of the high-frequency switching transistor 108 reduces noise that is generated in the transformer 118 when the high-frequency switching transistor switches on and off. As is known in the art, existing buck-boost converters include a switch in series with one winding in a transformer. When the switch opens and closes, transient noise is introduced into the transformer. The configuration of the circuit 160 removes the high-frequency transistor 108 from a series connection with the winding 119A to reduce the transient noise as the high-frequency transistor 108 switches on and off during operation of the circuit 160.

In the circuit 190, the arrangement of the inductors 112 and 120 generates an equivalent voltage differential across both of the inductors during operation. The inductors 112 and 120 also have an equivalent voltage differential in the circuit 180 if the isolation transformer 118 is configured with a 1:1 ratio. In a physical configuration of the circuits 180 and 190, both of the inductors 112 and 120 are formed with two different coils around a single inductor core, which reduces the physical size of the inverter circuits 180 and 190.

Figure 2:
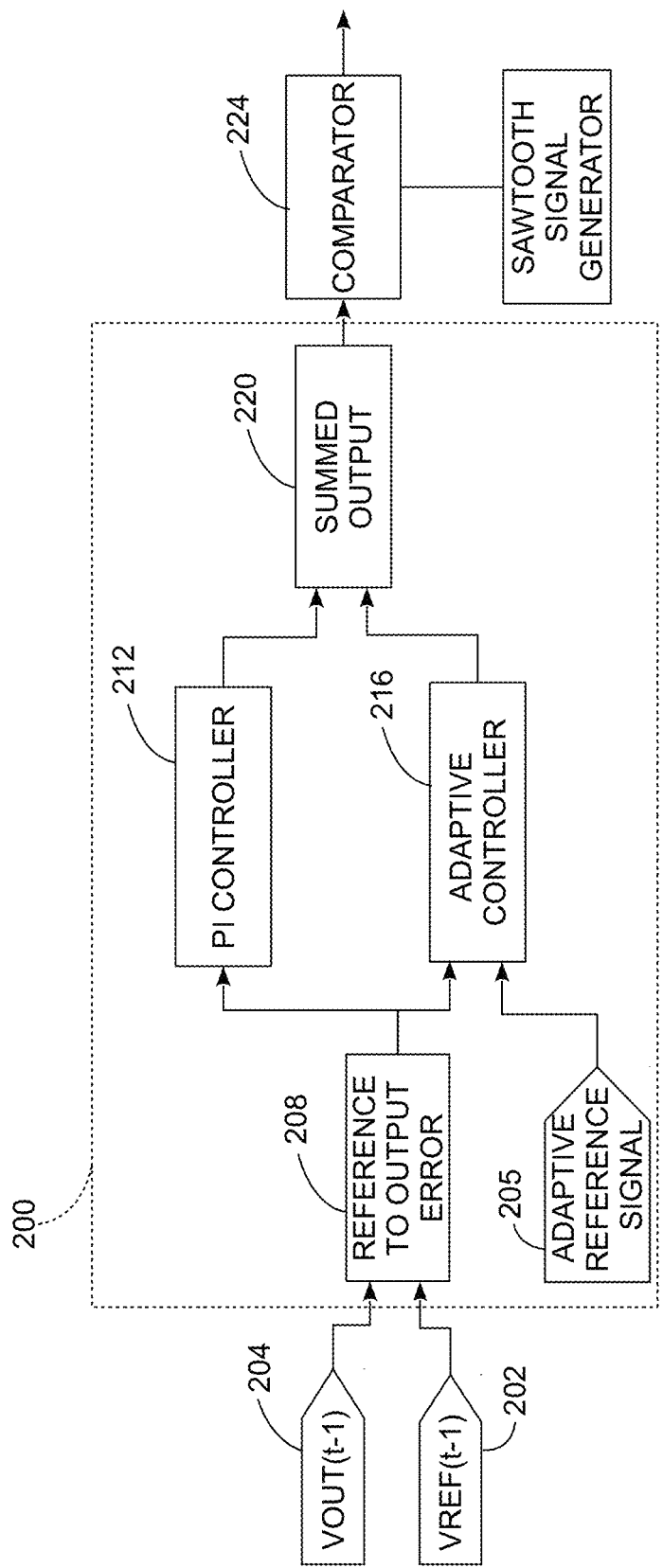
FIG. 2 is a block diagram of a hybrid proportional integral (PI) and adaptive controller configuration for use with the circuits depicted in FIG. 1A-FIG. 1E.

FIG. 2 is a more detailed depiction of the controller 200 that controls the generation of the PWM duty cycle value for the operation of the high-frequency transistor 108 in any of the converter and inverter circuits 10, 70, 90, 100, 150. 160, 170, 180, and 190. The controller 200 includes a PI controller 212 and an adaptive controller 216. The PI controller 212 generates a control signal with reference to an error generated by a difference circuit 208 between a measured output signal (VOUT) 204 from the inverter circuit, and a reference voltage signal generator (VREF) 202. The adaptive controller 216 generates another control signal with reference to the error from the difference circuit 208 and another reference signal from an adaptive reference signal generator 205.

As depict in FIG. 1A-FIG. 1E, FIG. 7B, FIG. 8A, and FIG. 8B, the output of the controller 200 is connected to the comparator 224, and the comparator 224 generates an output to control the duty cycle for switching the gate of the high-frequency transistor 108 with reference to the output of the controller 200 and the sawtooth signal from the sawtooth signal generator 328. Thus, the controller 200 adjusts the summed output 220 to vary the duty cycle of the transistor 108. The controller 200 adjusts the duty cycle of the high-frequency transistor 108 in a tracking mode to control the current flow from the DC source 104. The controller 200 adjusts the duty cycle for the high-frequency transistor 108 to track the predetermined AC or DC output waveform. The controller 200 adjusts the threshold output to adjust the duty cycle for operation of the high-frequency transistor 108 to produce the predetermined output waveform and to compensate for errors in the output waveform, including errors that are produced due to variations in the output of the DC source 104 during operation.

Referring again to FIG. 2, the controller 200 operates in a synchronous manner with reference to a clock signal having a predetermined length of time. The period of the clock signal is shorter than the period of the AC output signal. For example, in one embodiment the PI controller is operated with a clock signal of 2 KHz when generating an AC output signal of 60 Hz. The length of the clock period is sufficiently long to enable measurement of the VOUT 204 compared to the expected output from VREF 202. The controller 200 receives input data corresponding to the reference signal VREF 204 and the measured output of VOUT 204 from the inverter circuit during a previous cycle of the clock signal (t−1). A difference circuit 208 generates an error value for the controller 200 corresponding to the previous cycle of the clock as the difference between the expected voltage VREF 202 and the actual measured output voltage VOUT 204. The measured error 208 is the input to both a proportional-integral controller 212 and an adaptive controller 216.

In the controller 200, the PI controller 212 is configured to generate a control output signal that produces a PWM duty cycle for the high-frequency transistor 108 that generates an output AC signal with a waveform corresponding to the shape of the reference waveform VREF 202. The PI controller 212 generates an output $f_{PI}$ according to the following equation: $f_{PI}=eK_p+K_i \int e$ where e is the most recently measured error, $\int e$ is an accumulated error measured during a predetermined number of previous clock cycles during operation of the controller 200, $K_p$ is a proportional gain controller parameter, and $K_i$, is an integral gain parameter. The parameters $K_p$ and $K_i$ are identified empirically for one or more output AC signal waveforms and generally remain constant during operation of the inverter.

In the controller 200, the adaptive controller 216 is configured to generate an output signal that corrects the PWM duty cycle for the high-frequency transistor 108 to compensate for variations in both the output of the DC source 104 and changes to the impedance of the load 128. The adaptive controller 216 updates an adaptive gain value with reference to the measured error e. As is known in the art, the adaptive controller 216 implements a plant and a model. The plant represents a black-box operation of the inverter 100 with the only known parameters being the reference voltage from VREF 202, the output voltage VOUT 204, and the error 208. The model is a mathematical estimation of the output that the plant, such as one of the inverter circuits 100, 150, 160, 170, 180, or 190, generates for given inputs. The adaptive controller 216 generates an output $f_{AD}$ according to the following equation: $f_{AD}=k_r r+k_e(y_p-y_m)+k_p y_p$, where $k_r$, $k_p$, and $k_e$ are adaptive controller gains, r is the reference signal from the adaptive controller reference signal generator 205, and $y_p$ and $y_m$ represent plant and model outputs, respectively. In an adaptive controller, the controller gain values $k_r$, $k_p$, and $k_e$ are modified during operation based on the value of VREF 202 and the error 208. The gain values are modified according to the following equations: $k_r=-\int P_0 \text{sgn}(E)r$; $k_p=-\int P_0 \text{sgn}(E)y_p$; $k_E=-\int P_0 \text{sgn}(E)y_E$, where $P_0$ is a fixed adaptive gain value, E is the error, sgn(E) is the sign of the error (numerically +1 or −1), and $y_E$ is the error from the model, which is $y_p-y_m$. Thus, the gain values $k_r$, $k_p$, and $k_E$ are updated during operation of the adaptive controller 216.

In the controller 200, the output of the PI controller 212 and the adaptive controller 216 are added together to produce a summed output 220. The relative influence of the PI controller and the adaptive controller 216 in the final output from the hybrid controller 200 is configured with reference to the selected values of $K_P$ and $K_i$ in the PI controller 212 and the gain value $P_0$ in the adaptive controller 216. In one configuration, the values of $K_P$ and $K_i$ are larger than $P_0$, which enables the output of the PI controller 212 to dominate the summed output 220. In the PI-dominant configuration, the PI controller 212 forms the majority of the output control, and the adaptive controller 216 applies smaller changes to correct for changes in the input electrical current from the DC source 104 and changes in the impedance of the load 128. In another configuration, the relative value of the gain parameter $P_0$ is larger than $K_P$ and $K_i$ and the adaptive controller 216 dominates the summed output 220.

The controller 200 of FIG. 2 and additional components including the difference circuit 208 and comparator 224 can be implemented using either digital logic or analog circuits to identify the error between the reference and measured output signals, implement both the PI controller 212 and adaptive controller 216, and generate an output signal from the comparator 224 that controls the duty cycle of a PWM signal for the high-frequency transistor 108. In one embodiment, a digital microprocessor generates data corresponding to the reference signal VREF 202, while in an alternative embodiment an external signal generator produces the VREF reference signal 202, and the VREF signal is scaled numerically to have a magnitude that corresponds to the expected magnitude of VOUT 204. An analog to digital converter (ADC) produces a digital numeric value corresponding to VOUT 204, and the difference circuit 208 is implemented with a processor executing programmed instructions to identify the error. The processor also implements the PI controller 212 and adaptive controller 216, the summed output 220, and comparator 224 using software instructions stored in a memory. The processor 220 generates a logical high or logical low output in a PWM output signal to switch the high-frequency transistor 108.

Figure 3:
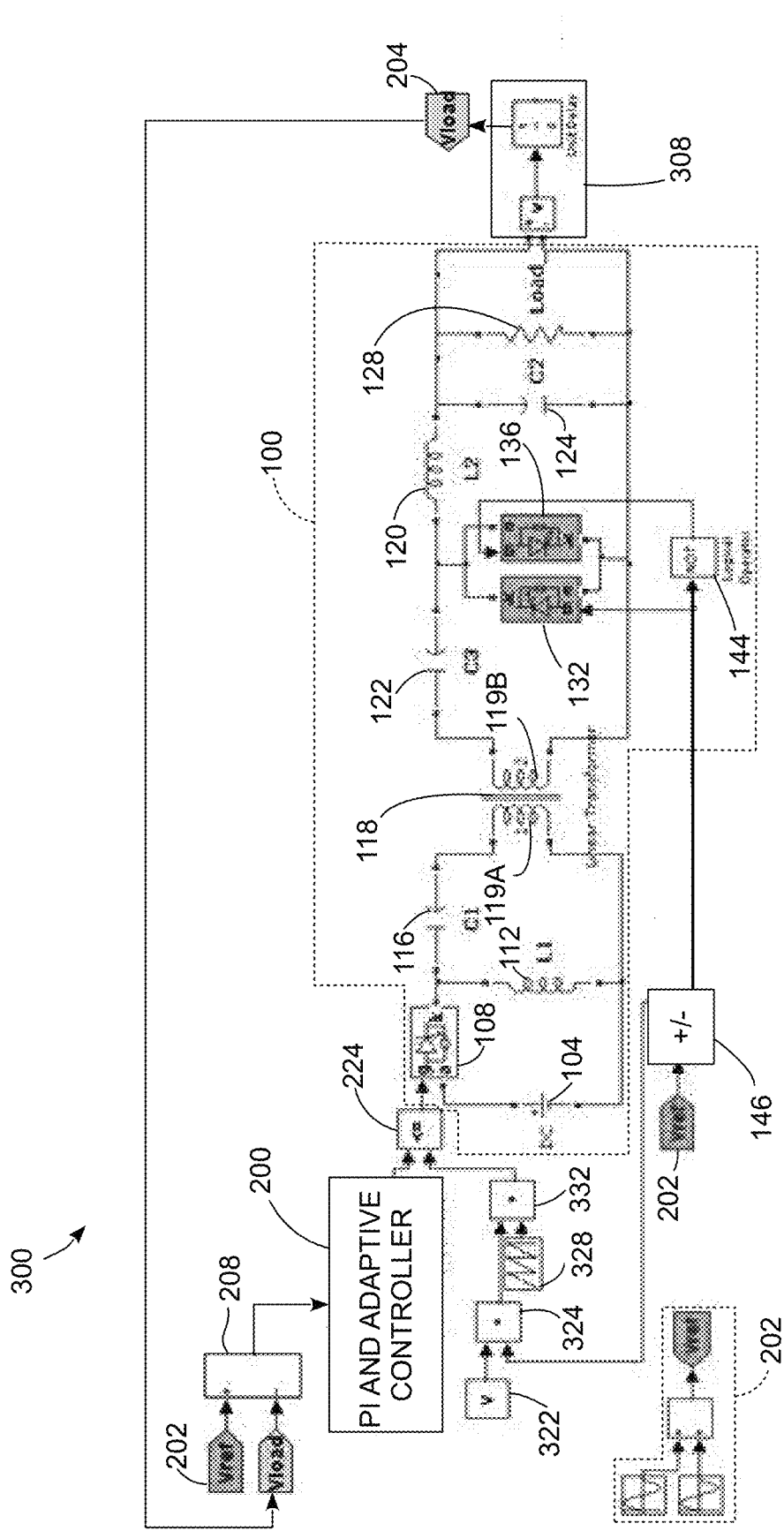
FIG. 3 is a schematic diagram of an inverter system including the circuit of FIG. 1A and the control system of FIG. 2.

FIG. 3 depicts an inverter system 300 including the inverter circuit 100 and the hybrid PI and adaptive controller 200. An alternative configuration of the inverter system 300 incorporates one of the inverter circuits 150, 160, 170, 180, or 190 instead of the inverter circuit 100. In addition to the elements described above with reference to FIG. 1A and FIG. 2, the system 300 includes a sample-and-hold voltage sensor 308, peak amplitude source 322, multipliers 324 and 332, and a saw-tooth waveform generator 328. During operation, the sample-and-hold voltage sensor 308 samples the output signal from the inverter 100 for a predetermined time period, which typically corresponds to a length of a clock signal used to operate the hybrid controller 200. The sensor 308 supplies a value corresponding to the load voltage VLOAD 204 to the error difference circuit 208 along with the output of VREF 202 to provide an error feedback value to the controller 200. The controller 200 operates in a closed loop mode with error feedback corresponding to the error between the output of the inverter 100 and the VREF 202. In the inverter system 300, the peak amplitude source 322, multipliers 324 and 332, and a saw-tooth waveform generator 328 can be implemented as programmed instructions that are executed by a digital logic device that implements the controller 200 or as separate analog or digital components.

In the system 300, the saw-tooth signal generator 328 generates a saw-tooth wave at the switching frequency of the high-frequency transistor 108. For example, in an embodiment where VREF 202 is a 50 Hz or 60 Hz AC signal, the signal generator 328 generates a saw-tooth wave with a frequency of 2 KHz to enable the high-frequency transistor 108 to switch at a much higher frequency than the output signal from the inverter 100. The frequency of the signal generator 328 can be adjusted to enable a continuous current mode of operation for different output waveform frequencies. The peak amplitude source 322 represents a peak magnitude of the voltage signal from VREF 202. For example, a 120 V AC signal has a peak amplitude value of 60 volts and a total amplitude of 120 volts between a +60 V peak and −60 V trough. The multiplier 324 multiplies the output of the sign generator 146 and the peak magnitude 322 to generate either a +1 (positive) or −1 (negative) output value. In the configuration of FIG. 3, the multiplier 324 is configured to interpret a logical low output from the sign generator 146 as a numeric −1 and a logical high output as a +1 value. The second multiplier 332 multiplies the positive or negative voltage magnitude value from the multiplier 324 by the saw-tooth signal from the saw-tooth signal generator 328 to generate a scaled saw-tooth output waveform that is supplied to the comparator 224.

The comparator 224 compares the output of the controller 200 to the scaled saw-tooth signal from the signal generator 328 and the multiplier 332. When the output level of the PI and adaptive controller 200 is greater than or equal to the value of the multiplied saw-tooth signal, the high-frequency transistor 108 is switched on to enable current from the DC power source 104 to flow to the inverter 100. When the saw-tooth waveform is greater than the output of the controller 200, the high-frequency transistor 108 switches off. As depicted in FIG. 5A and FIG. 5B, the controller 200 adjusts the duty cycle of the switching signal that supplies the transistor 108 for PWM control of the supply between the DC source 104 and the inverter circuit 100 in FIG. 3. In FIG. 5A, the controller 200 generates an output threshold signal 506 to turn on the high-frequency transistor 108 during the times corresponding to the square waves 504. In FIG. 5B, the controller 200 generates a higher output signal 510 to produce a square wave 508 with a higher duty cycle. During operation, the controller 200 raises and lowers the signal to adjust the duty cycle of the output signal applied to the high-frequency transistor 108 to generate an output AC signal that corresponds to the waveform of VREF 202.

As described above, the inverter system 300 is configured to generate an AC waveform corresponding to the reference waveform from the reference waveform generator VREF 202. While the examples of FIG. 6A-FIG. 6E depict generation of an AC signal with a sinusoidal waveform for a range of different load impedance values and power output levels. FIG. 6A-FIG. 6E also depict the error between the actual output of the inverter and a reference sinusoidal waveform. The error remains within acceptable limits for a wide range of loads even as the impedance of the load changes in the examples FIG. 6A-6E. Additionally, the inverter system 300 maintains a stable output during fluctuations of the DC power source 104 within a predetermined operating range. For example, the DC power source 104 could be a photovoltaic solar power array or other DC power source that experiences fluctuations in the DC power output level. FIG. 6F depicts a sinusoidal output waveform from the inverter 300 that maintains a stable output when the DC power source 104 increases output from 75 V to 100 V at 0.05 seconds in the graph. Thus, the inverter system 300 generates stable output waveforms with low error levels over a wide range of load impedance and power levels, and during changes in the power supplied from the DC power source 104.

The inverter system 300 can generate a wide range of signals through generation of different reference waveforms with the VREF 202. For example, the VREF 202 can generate AC signals with a target voltage of 240 V at a frequency of 50 Hz or 120 V at a frequency of 60 Hz to conform the signals to the requirements for power grids in different geographic regions. In a digital embodiment, the VREF 202 can be programmed to generate data corresponding to multiple waveforms and the system 300 can generate multiple waveform types without requiring reconfiguration of the inverter circuit 100 or control system 200. For example, in FIG. 6G, the reference signal from VREF 202 changes from a simple sinusoid to an arbitrary output AC waveform during a time period of a few hundredths of a second. The inverter system 300 tracks the output of VREF 202 and produces an output signal that tracks the changing reference signal closely. In another configuration, the inverter system 300 can be directly connected to a motor or other device that operates with an alternative AC signal such as 400 Hz waveforms with various voltage levels. The inverter system 300 can generate non-sinusoidal waveforms, such as square or triangular waveforms, as well as harmonic waveforms. For example, in a robotics application the inverter system 300 generates negative and positive DC outputs at different times to control the speed and direction of a DC motor. In FIG. 6H, the output signal from VREF 202 is tied to a control system for a DC motor in a robot (not shown). The output signal is a DC signal with a positive voltage output to drive the motor in one direction and a negative voltage output to drive the DC motor in the opposite direction. The level of the DC output voltage is adjusted to adjust the rate of speed for the DC motor. As described above, in the configuration of the circuit 10, the circuit generates a DC output signals at different levels and with positive or negative polarity for a arbitrary lengths of time based on the operational requirements of the DC motor in the load. The voltage level for VREF 202 controls the speed of the DC motor and the polarity controls the direction of rotation of the DC motor. The inverter 300 produces the waveform in FIG. 6H including the selected voltage levels and output polarities from VREF.

In addition to different waveform shapes, the VREF 202 can produce non-uniform waveforms. For example, in a configuration where the load 128 introduces noise to the AC signal, the VREF 202 can be configured to modify the reference AC waveform, and the system 300 generates the modified AC waveform that cancels the noise in an active cancellation strategy. A traditional inverter includes filters not only to reduce noise, but to shape the desired waveform of the output AC signal from an input signal that is often shaped as a square-wave. The filters in existing inverters reduce noise and generate a desired waveform shape, but also reduce the efficiency of the inverter by absorbing energy that could be provided to the output signal. By contrast, the inverter system 300 does not require separate filters to generate the desired waveform shape. Instead, the controller 200 shapes the waveform of the AC output signal to reduce errors while not requiring filter circuits. For example, in one configuration in which a traditional H-bridge inverter provides 50% DC to AC power conversion efficiency, the inverter system 300 provides 80% DC to AC power conversion efficiency. In another configuration in which the H-bridge provides 80% DC to AC power conversion efficiency, the inverter system 300 provides over 97% DC to AC power conversion efficiency.

Figure 4:
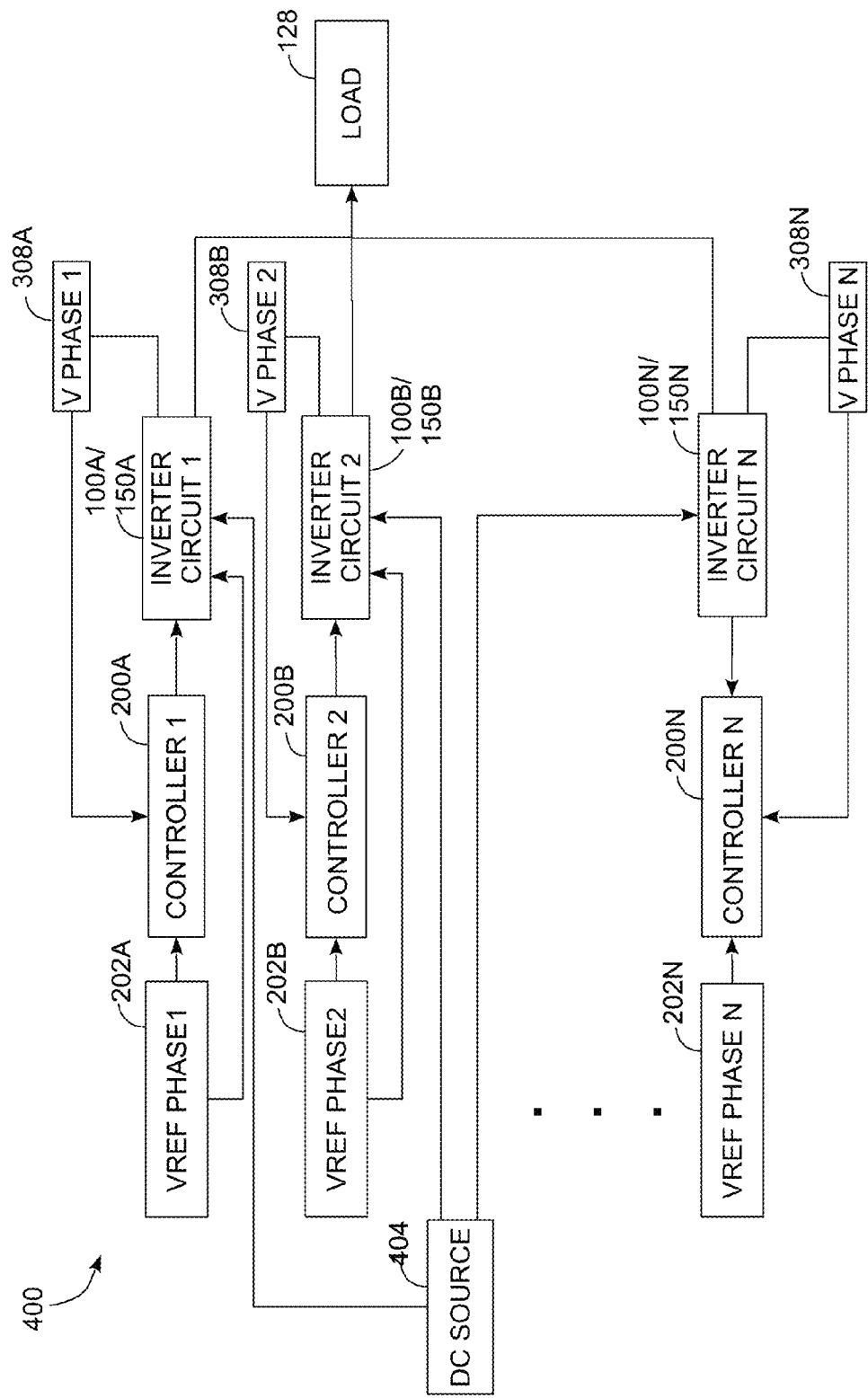
FIG. 4 is a block diagram of a multi-phase inverter system that incorporates the inverters of FIG. 1B-FIG. 1E and controller of FIG. 2.

FIG. 3 depicts a configuration of an inverter system 300 for generating an AC output waveform with a single phase output. That is to say, the AC waveform includes a single time-varying component, such as a single 50 Hz or 60 Hz sinusoidal waveform. As is known in the art, many devices including electric motors operate with a multi-phase input waveform. For example, three-phase and five-phase electrical currents can be used to drive appropriately configured motors. FIG. 4 depicts a schematic diagram of an inverter 400 that is configured to generate a multi-phase AC signal from a single DC power source 404.

In FIG. 4, a series of reference signal generators 202A-202N generate N individual phases of a combined multi-phase output signal in a multi-phase inverter 400. For example, in a three-phase embodiment, three VREF signal generators produce three sinusoidal signals that are each offset by a 120° phase angle. Each of the N phases is generated in association with an instance of the controller with controllers 200A-200N and one of inverter circuits 100A-100N or 150A-150N, respectively. Alternative configurations of the multi-phase inverter 400 include the inverter circuits 160, 170, 180, and 190 in the configuration depicted in FIG. 4. Each of the controllers 200A-200N receives feedback from an output voltage sensor 308A-308N, respectively. Thus, each phase of the multi-phase signal is generated using a single reference signal in a configuration similar to the single-phase inverter system 300. In one embodiment, the multiple VREF generators 202A-202N and controllers 200A-200N are implemented using programmed instructions executed by a single digital processing device. The multi-phase inverter 400 incorporates N separate inverter circuits using N instances of either, for example, the inverter circuit 100 or 150. The multi-phase inverter system 400 can be reconfigured to generate signals with up to N phases, where N can be configured based on the hardware and software configuration of the inverter system 400. For example, in one configuration the multi-phase inverter system 400, which is configured to generate an output waveform with five phases, can also generate AC signals with one through four phases.

Figure 9:
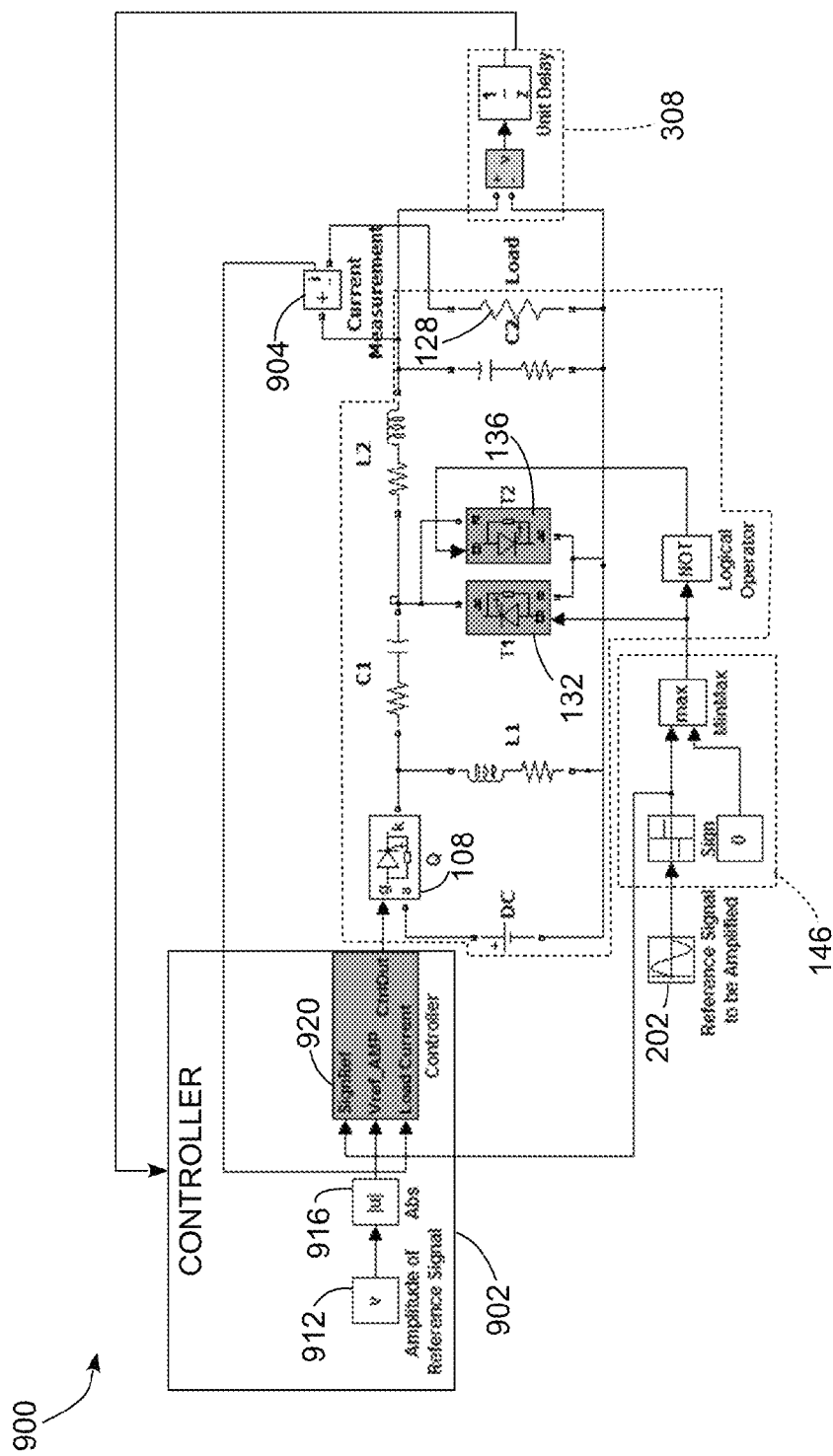
FIG. 9 is a circuit diagram of an inverter that is configured to operate in a current-limited or power-limited mode.
Figure 10:
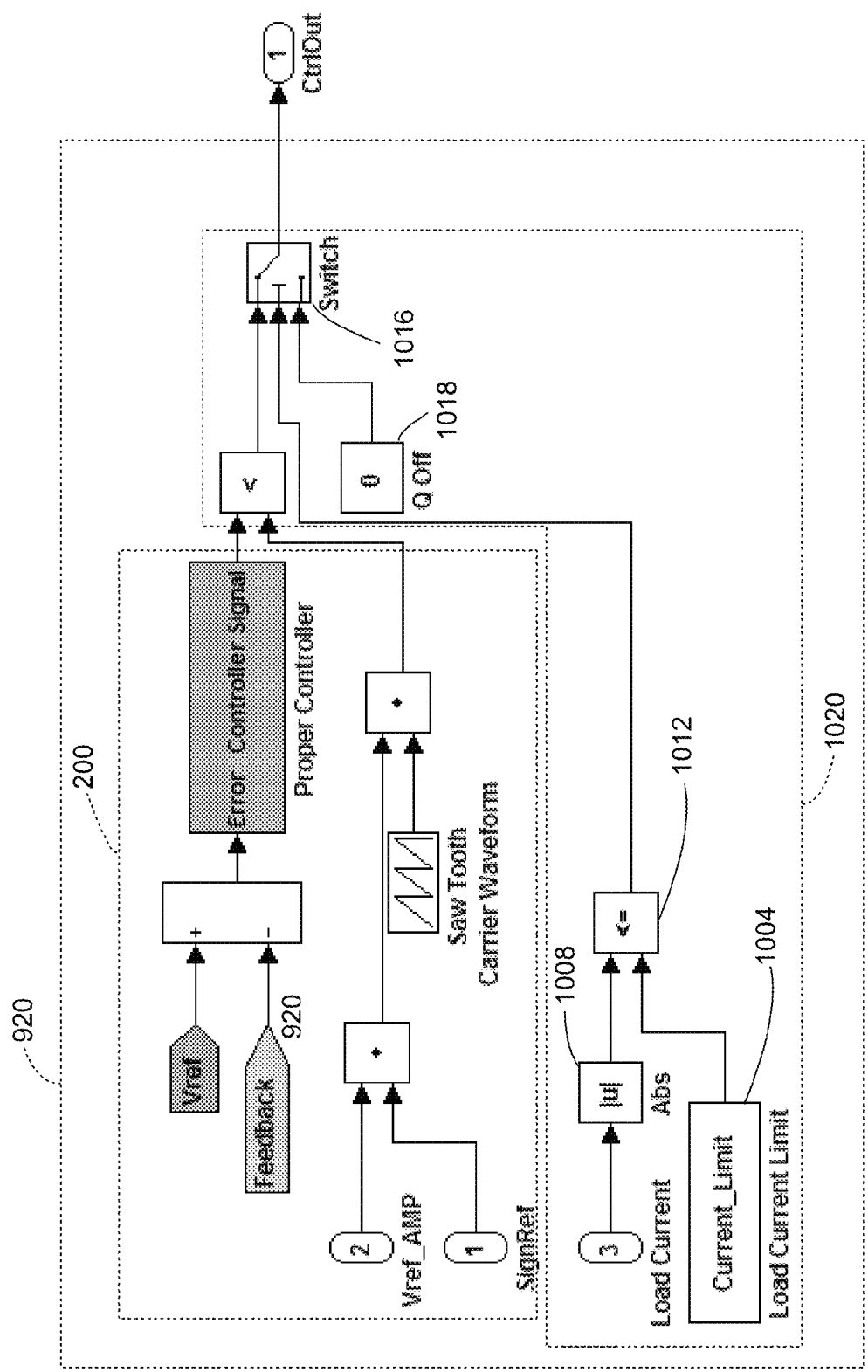
FIG. 10 is a block diagram of the inverter of FIG. 9 depicting a current limiting controller.

FIG. 9 and FIG. 10 depict an inverter 900 that is configured to operate in a current-limited mode. The inverter 900 includes circuit elements that are similar to the inverter of FIG. 3, including a controller 902, single-switching transistor 108 and synchronous switching transistors 132 and 136, a load 128, a reference signal generator 202 and sign generator 146, and the sample-and-hold voltage sensor 308, which provides feedback to the controller 902. The inverter embodiment in FIG. 9 is depicted in a non-isolated configuration for illustrative purposes, but an alternative configuration includes an isolation transformer, such as the transformer 118, which is depicted in FIG. 3. In the current-limited mode, the controller 902 receives signals from a current monitor 904, such as an ammeter. The AC output that is delivered to the load 128 varies over time. In one embodiment, the current monitor 904 identifies a magnitude of a root-mean-squared (RMS) current magnitude that is delivered to the load 128 over a predetermined time period, such as a 10 millisecond period. The current monitor 904 continuously identifies changes in the RMS current magnitude to identify the magnitude of the current delivered to the load 128 for a wide range of AC waveforms.

During operation, if the level of current exceeds a predetermined threshold, then the controller 902 turns off the single-switching transistor 108 until the level of current that is delivered to the load 128 drops below a predetermined level. For example, if the inverter 900 is configured to deliver a maximum amplitude of 10 amperes of alternating current to the load 128, then the controller 902 turns off the switching transistor 108 in the event that the measured current to the load 128 exceeds 10 amps, and the controller 902 returns control of the high-frequency switching transistor 108 to the control methods described above, such as the combined PI and adaptive controller 200 depicted in FIG. 2, when the measured current drops below 10 amperes. The current-limiting function ensures that the load 128 does not receive a level of electrical current that could cause damage to one or more components in the load 128 during operation.

As depicted in FIG. 10, the controller 920 includes the PI/adaptive controller 200 or another suitable controller that operates the high-frequency switching transistor 108 to generate an output signal that corresponds to the reference signal from a DC source. In the controller 920, the module 1020 includes a hardware or software current limit 1004 corresponding to a predetermined maximum current that is delivered to the load 128. In one embodiment, the load current limit 1004 is stored in a memory associated with the controller 920 during the manufacture of the inverter, while in another embodiment the current limit 1004 is selected from a predetermined current range for different applications of the inverter. During operation, a comparator 1012 compares the current limit 1004 to an absolute value of the identified load current 1008. If the comparator 1012 identifies that the absolute value of the load current 1008 exceeds the load current limit 1004, then the module 1020 operates a bypass switch 1016 to generate an output control signal, which is labeled as Q Off 1018, to turn the high-frequency switching transistor 108 off. The module 1020 overrides the output of the controller 200 when the identified current that is applied to the load exceeds the current load limit value 1004. In one embodiment, the bypass switch 1016 is a physical relay or other electromechanical switch that is operated by a control signal generated in the controller 920. In another embodiment, the bypass switch 1016 is implemented as a solid-state circuit or a software component in the controller 920 to select between the output from the controller 200 or the deactivation signal 1018 for operation the high-frequency switching transistor 108.

Figure 11:
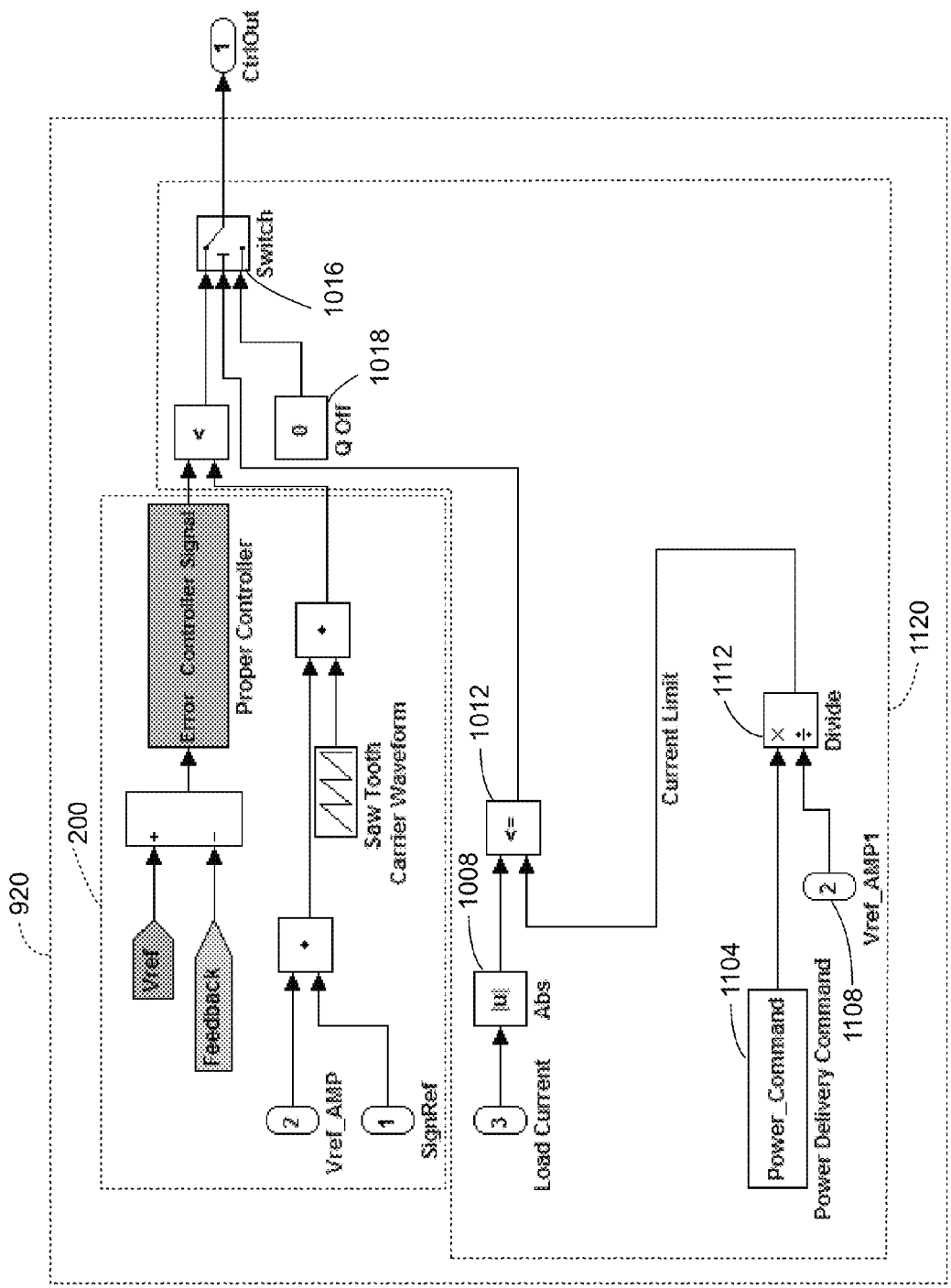
FIG. 11 is a block diagram of an inverter with a controller that is configured to operate in a power-limited mode.

FIG. 11 depicts another configuration of the controller 920 in the inverter. In FIG. 11, a module 1120 includes a module 1104 that specifies the maximum level of power that should be provided to the load 128 from the inverter. As is known in the art, the electrical power of the AC output signal is identified as a product of the voltage multiplied by the current. The module 1120 uses the maximum power threshold 1104 as a reference, and identifies whether the total power is exceeded by dividing the total power threshold 1104 by the identified AC voltage 1108 to identify a maximum electrical current level that is delivered to the load for the identified AC output voltage level. A voltage sensor in the inverter generates a voltage output 1108 corresponding to the voltage of the AC signal that is driving the load 128. A divider 1112 divides the maximum power 1104 by the identified voltage 1108 to generate a maximum current limit level value, where the maximum current level can vary based on changes in the voltage of the load 128. The module 1120 then compares the maximum current from the divider 1112 to the identified load current 1008, and the comparator 1012 operates the bypass switch 1016 to turn off the high-frequency switching transistor 108. The module 1120 overrides the output of the controller 200 when the power delivered to the load 128 exceeds a predetermined maximum power limit, and the module 1120 enables the controller 200 after the identified level of power that is delivered to the load 128 decreases to a level below the predetermined maximum power level.

Figure 12:
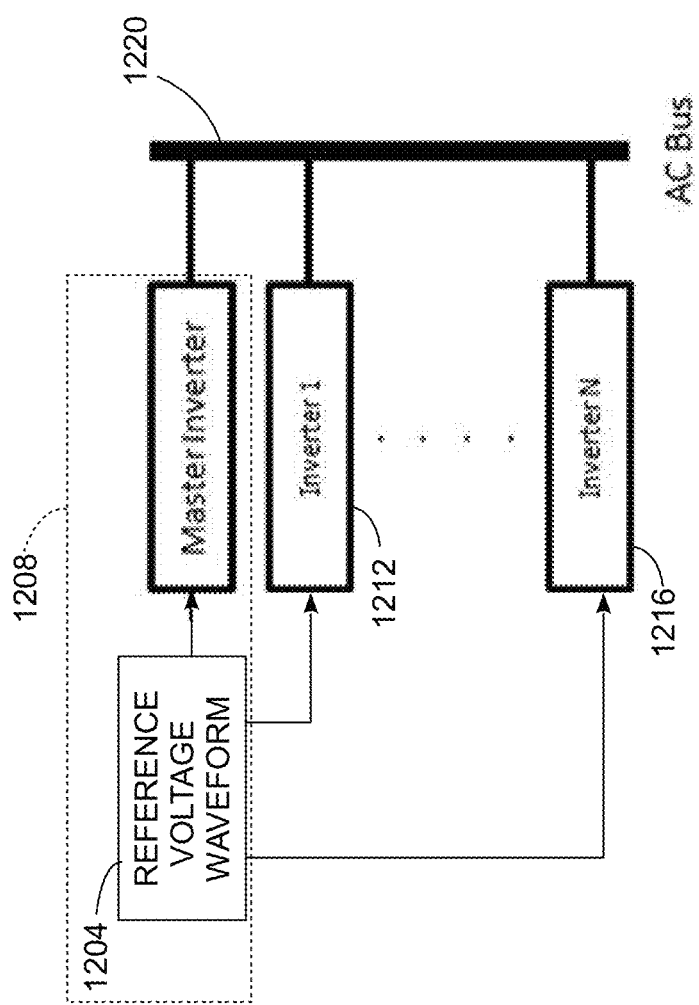
FIG. 12 is a schematic diagram of a system including multiple inverters that are configured to generate AC output signals with a frequency, waveform, and phase that are synchronized with the AC output of a reference inverter.

FIG. 12 depicts an arrangement of multiple inverters that each produce an AC output that flows through a common AC output bus. In one configuration, each of the inverters that is depicted in FIG. 12 is connected to a separate DC power source, such as one or more solar panels, and the inverters generate an AC output that combines the electrical energy produced by all of the solar panels in a solar array. In FIG. 12, a single reference voltage waveform generator 1204 provides a reference AC signal to each of the inverters 1208, 1212, and 1216. In alternative configurations, the inverter system of FIG. 12 includes two or more inverters. Each of the inverters 1208-1216 is configured with one of the inverter circuit and controller embodiments described above. In FIG. 12, the inverter 1208 is configured to act as a master inverter, which generates an AC output from the reference voltage waveform 1204. The output of the reference voltage generator 1204 is also connected to the inverters 1212 and 1216, which either do not include independent reference signal generators or deactivate the reference signal generators when the master inverter 1208 is activated.

During operation, each of the inverters generates an adapted output based on the single reference signal from the reference waveform generator 1204. While each of the inverters 1208-1216 can receive different DC input signals from independent DC power sources, each of the inverters outputs a single AC waveform with the same frequency and phase as the master inverter 1208 to the AC bus 1220. In a current-limited embodiment, a portion of the inverters provide the AC output to the AC bus 1220 with a predetermined current limit, while other inverters are deactivated until the total magnitude of current on the AC bus 1220 drops below the predetermined threshold. Thus, the inverters 1208-1216 activate and deactivate in a dynamic manner to ensure that the AC bus 1120 delivers a consistent AC power signal. In some embodiments, if the master inverter 1208 is deactivated or becomes non-functional, then another one of the inverters activates a reference signal generator and assumes the role of the master inverter. Thus, the configuration of inverters that is depicted in FIG. 12 provides AC output to a single AC power bus 1120 from multiple DC power sources in parallel, while providing fault tolerance if the master inverter 1208 is deactivated or fails.

Figure 13:
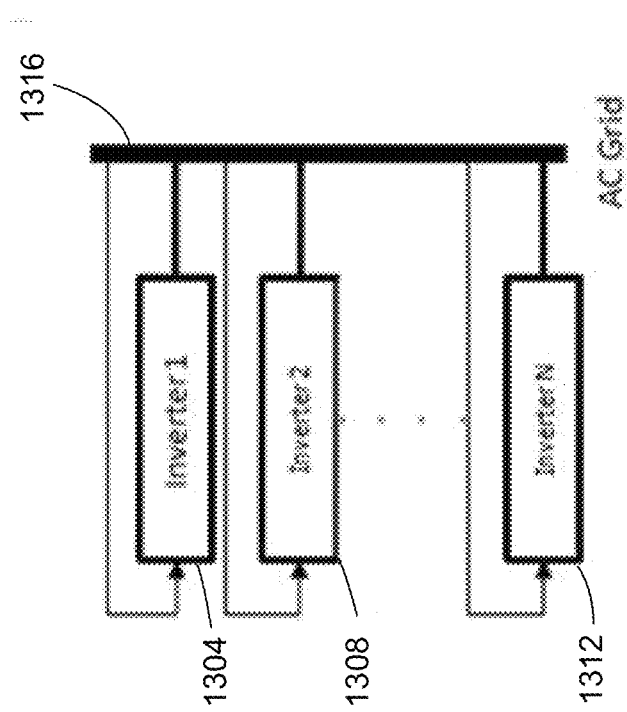
FIG. 13 is a schematic diagram of a system including multiple inverters that are configured to generate AC output signals with a frequency, waveform, and phase that are synchronized with an external AC signal.

FIG. 13 depicts another arrangement of multiple inverters that each produce an AC output that is supplied to an electrical power grid. FIG. 13 includes inverters 1304, 1308, and 1312 that each supply an AC output signal to an electrical power grid 1316. In one embodiment, the inverters 1304-1316 are outputs from a power plant, such as a solar power plant, that convert DC power from the power plant into an AC output that is compatible with a power grid. The power grid 1316 carries an AC power signal, such as a single-phase or multi-phase AC signal, and the inverters 1304-1312 supply additional electrical energy to the power grid 1316 for distribution to electrical devices that are connected to the power grid 1316. In the embodiment of FIG. 13, multiple inverters provide parallel power generation for single-phase or multi-phase AC electrical grids in parallel. Redundant sets of inverters that generate AC output signals in synchronization with one or more phases in the AC power grid also provide fault tolerance if some of the inverters are deactivated or fail.

In FIG. 13, each one of the inverters 1304-1312 receives a reference signal corresponding to the AC signals that are already carried by the power grid 1316. Thus, each of the inverters 1304-1312 delivers an AC output signal to the power grid 1316 with an AC waveform, frequency, and phase that conforms to the AC signal that is delivered through the power grid 1316. The inverters 1304-1312 deliver different AC output signals to the electrical grid 1316 based on the amount of DC power that is delivered from the DC power sources that are connected to each of the inverters and based on the demand for additional AC power from the power grid 1316. In one configuration, the AC power grid 1316 delivers an AC power signal in three phases. Each one of the inverters 1304-1312 receives a reference signal corresponding to only one of the phases, and the inverters 1304-1312 deliver three-phase power to the AC electric grid 1316.

Figure 14C:
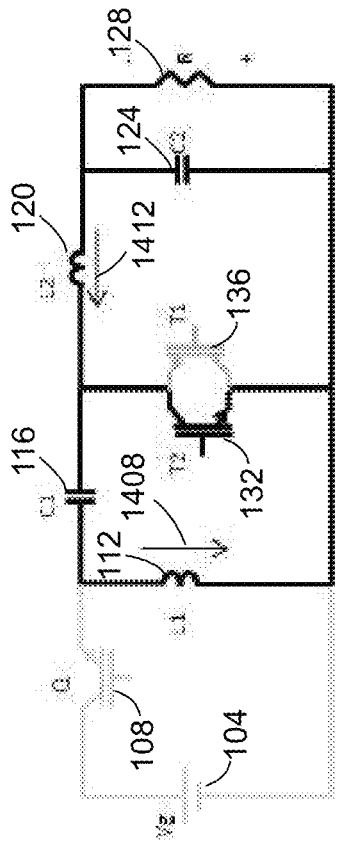
FIG. 14C is a schematic diagram of the single-switch inverter circuit of FIG. 14A while the circuit transitions from a positive peak voltage output to a negative peak voltage output.
Figure 14D:
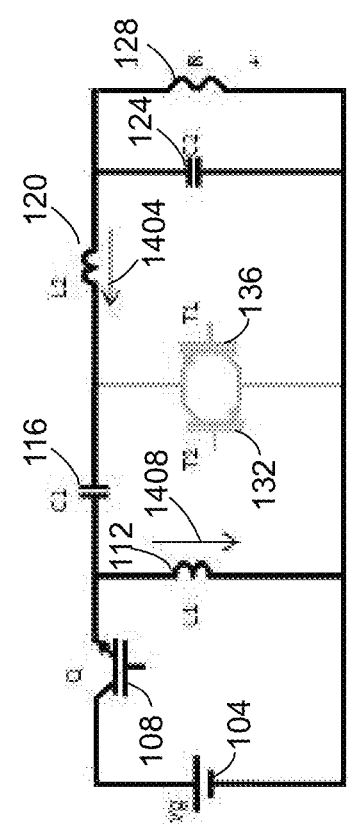
FIG. 14D is a schematic diagram of the single-switch inverter circuit of FIG. 14A while the circuit generates a negative peak voltage output.
Figure 14A:
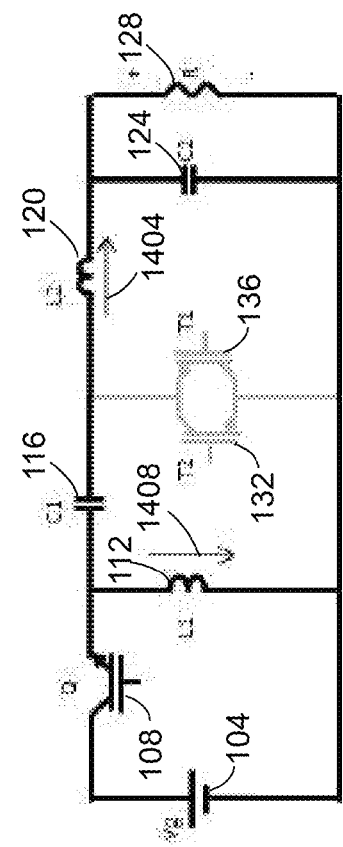
FIG. 14A is a schematic diagram of a single-switch inverter circuit while charging an inductor to reach a positive peak voltage.
Figure 14B:
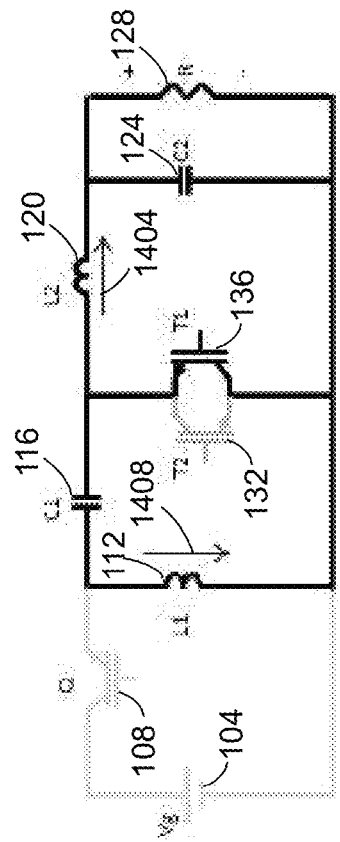
FIG. 14B is a schematic diagram of the single-switch inverter circuit of FIG. 14A while the circuit generates a positive peak voltage output.

FIG. 14A-14D depicts the circuit elements that are described above in FIG. 1B-FIG. 1E in different operating modes of an inverter. In FIG. 14A, the output signal reaches a positive peak with the high-frequency transistor 108 switched on to charge the inductor 112, switching transistor 132 switched off, and switching transistor 136 switched off. In FIG. 14A, the capacitor 116 is fully charged and a current 1408 flows through the inductor 112 instead of through the transistor 132. Current 1404 also flows through the inductor 120 in FIG. 14A. FIG. 14B depicts the circuit during output of a positive peak voltage with the high-frequency transistor 108 switched off, switching transistor 132 switched off, and switching transistor 136 switched on. In FIG. 14B, the inductor 112 discharges the current 1408 while current 1404 flows through the inductor 120.

FIG. 14C depicts the circuit during a transition from a positive peak voltage to a negative peak voltage. In FIG. 14C, the high-frequency switching transistor 108 is switched off, switching transistor 132 is switched on, and switching transistor 136 is switched off. In FIG. 14C, the inductor 112 discharges current 1408, and a current 1412 flows through the inductor 120. The current 1412 flows in the opposite direction than the current 1404 depicted in FIG. 14A-FIG. 14B because the circuit is transitioning to a negative output instead of the positive output depicted in FIG. 14A-FIG. 14B. FIG. 14D depicts the circuit at a negative voltage peak with the high-frequency transistor 108 switched on, transistor 132 switched off, and transistor 136 switched on. In FIG. 14D, the DC power source 104 charges the inductor 112 and current 1408 flows through the inductor 112. The current 1412 flows through the inductor 120. Transistor 136 is switched on, but the direction of the negative current flow 1412 effectively prevents a flow of current through either of the transistors 132 and 136.

In each of the configurations 14A-14D, the power source 104 either charges the LC circuit with the inductor 112 and capacitor 116 with a current flowing in direction 1408 or the inductor 112 and capacitor 116 discharge the current in direction 1408. The direction of the currents 1404 and 1412 through the inductor 120 affect the charge that loads the capacitor 124 and subsequent output voltage. For example, the current 1404 produces a positive charge and positive voltage output from the capacitor 124, and the current 1412 produces a negative charge and negative voltage output from the capacitor 124.

Figure 15:
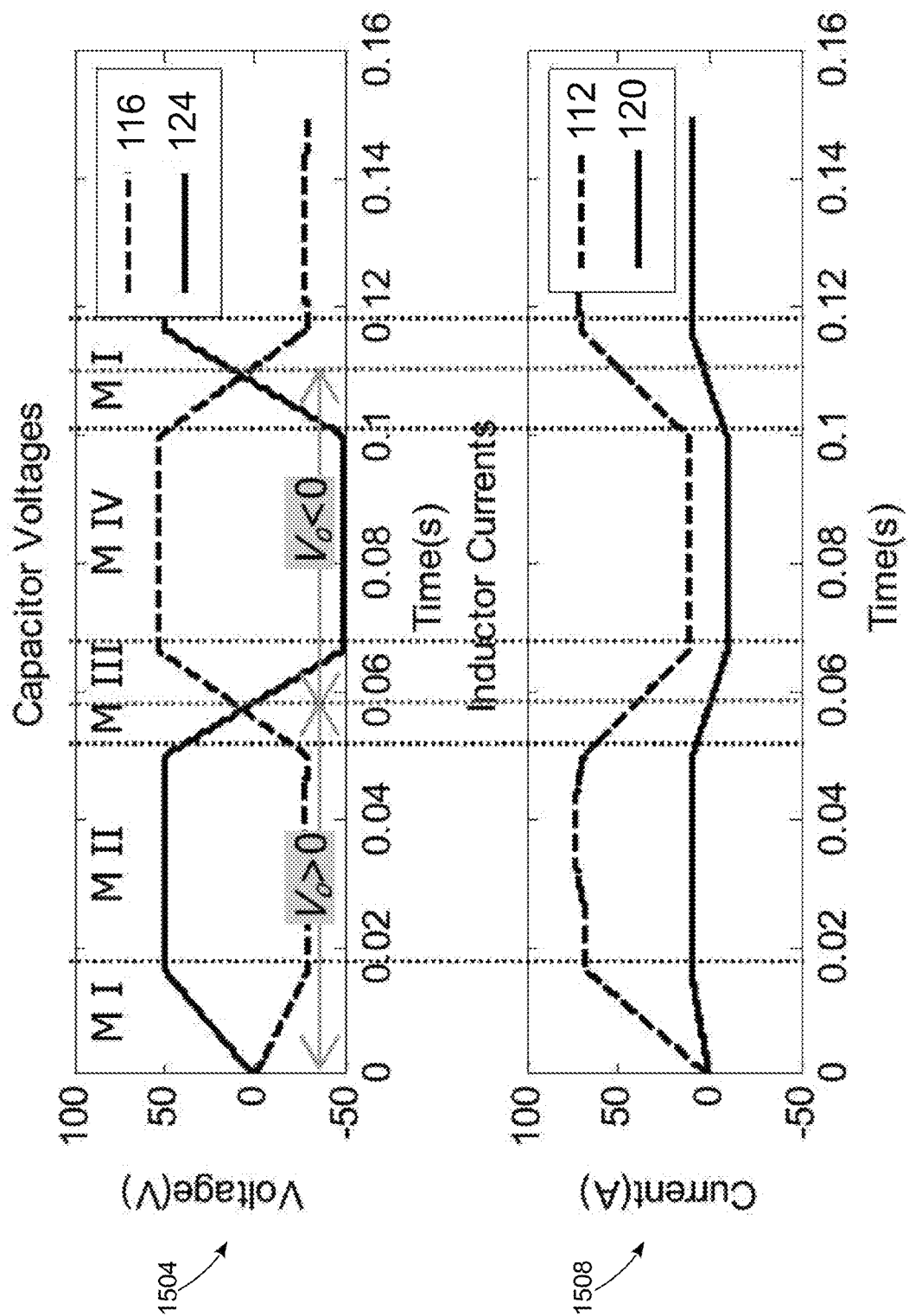
FIG. 15 is a set of graphs depicting capacitor voltages and inductor currents during operation of the inverter circuit depicted in FIG. 14A-FIG. 14D.

FIG. 15 depicts the charge cycles of the capacitors 116 and 124 and of the inductors 112 and 120 during positive and negative cycles of output for an AC signal. The graph 1504 depicts the voltage charges in the capacitors 116 and 124 during positive and negative output cycles. The charge level for the output capacitor 124 corresponds to an output voltage for the circuit that is delivered to the load 128. The graph 1508 depicts the current flow through the inductors 112 and 120. The inductor 112 receives current from the DC source 104, and the inductor 120 delivers the currents to apply a positive or negative charge to the capacitor 124.

As described above, the inverter circuit and control systems are configured to generate an output electrical signal given a DC power source. The controller tracks the reference signal to adjust the output to correspond to the reference signal waveform while minimizing the effects of noise in the system or variations in the output of the DC source. In another configuration, the single switch inverter system is incorporated into a larger power generation system where another generation source produces an AC electrical signal. For example, a power generator or another DC to AC inverter generates an AC signal. The AC signal from the external source often includes noise and other distortions to the AC signal waveform. The inverter system described above conditions the output signal from the noisy external AC signal source to generate a combined output AC signal in which the noise is reduced or eliminated in the combined waveform.

Figure 16:
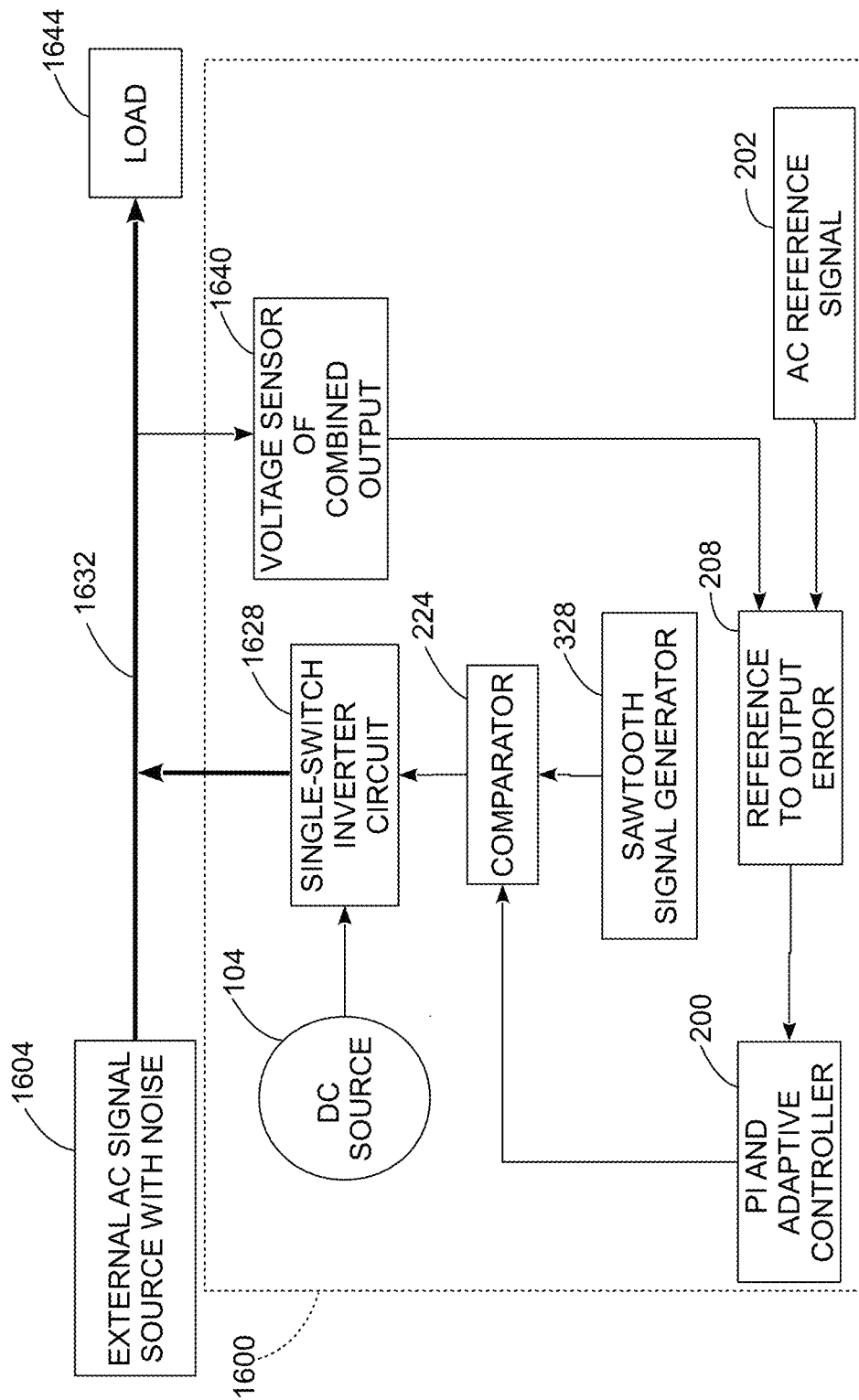
FIG. 16 is a schematic diagram of a power conditioning system that reduces or eliminates noise in an AC signal that is generated by an external AC generation source.

FIG. 16 depicts a noisy external AC signal source 1604, a power line 1632, and a load 1644. In FIG. 16, a power conditioning system 1600 includes a DC power source 104, controller 200, AC reference signal generator 202, difference circuit 208, comparator 224, sawtooth signal generator 328, single-switch inverter circuit 1628, and a voltage measurement circuit 1640 that measures a combined output of the single switch inverter circuit 1628 and the external AC signal noise source 1604. The external AC signal source 1604 includes one or more power generators, AC to DC inverters, or any other source for an AC signal. The reference signal generator 202 generates a predetermined waveform that corresponds to an expected output of the external AC signal source 1604 in the absence of noise. The single-switch inverter circuit 1628 includes a circuit with one of the circuit configurations described above in the circuits of FIG. 1B-1E, FIG. 3, FIG. 7A-7B, FIG. 8A-FIG. 8B, and FIG. 9-FIG. 11.

During operation of the system 1600, the power line 1632 carries the noisy AC signal, and the output of the system 1600 is electrically connected to the line 1632. The voltage sensor 1640 generates voltage readings corresponding to a combination of the noisy AC signal from the external signal source 1604 and the output of the system 1600. Thus, the output of the voltage sensor 1640 records errors in the combined AC signal on the line 1632, including noise from the external source 1604 and potential noise from within the system 1600. The difference circuit 208 identifies the difference between the noisy signal and the controller 200 identifies the noise as an error. The controller 200 adjusts the threshold output for the comparator 224 to correct for the noise in the signal from the external AC source 1604.

In one configuration, the system 1600 generates an output signal from the single switch inverter circuit 1628 that actively cancels noise in the AC signal from the external AC signal source 1604 using either constructive or destructive interference to generate a combined AC signal with a waveform that corresponds to the reference signal. Thus, the system 1600 may emit a signal waveform that does not directly correspond to the reference signal waveform from the reference signal generator 202, but the combination of the noisy signal from the external AC signal source 1604 and the output of the system 1600 conforms to the AC reference signal waveform. If the magnitude or type of noise in the signal from the external AC source 1604 changes over time, the system 1600 identifies the new noise components as errors and generates a modified correction signal to correct for different errors in the external AC signal.

Figure 17:
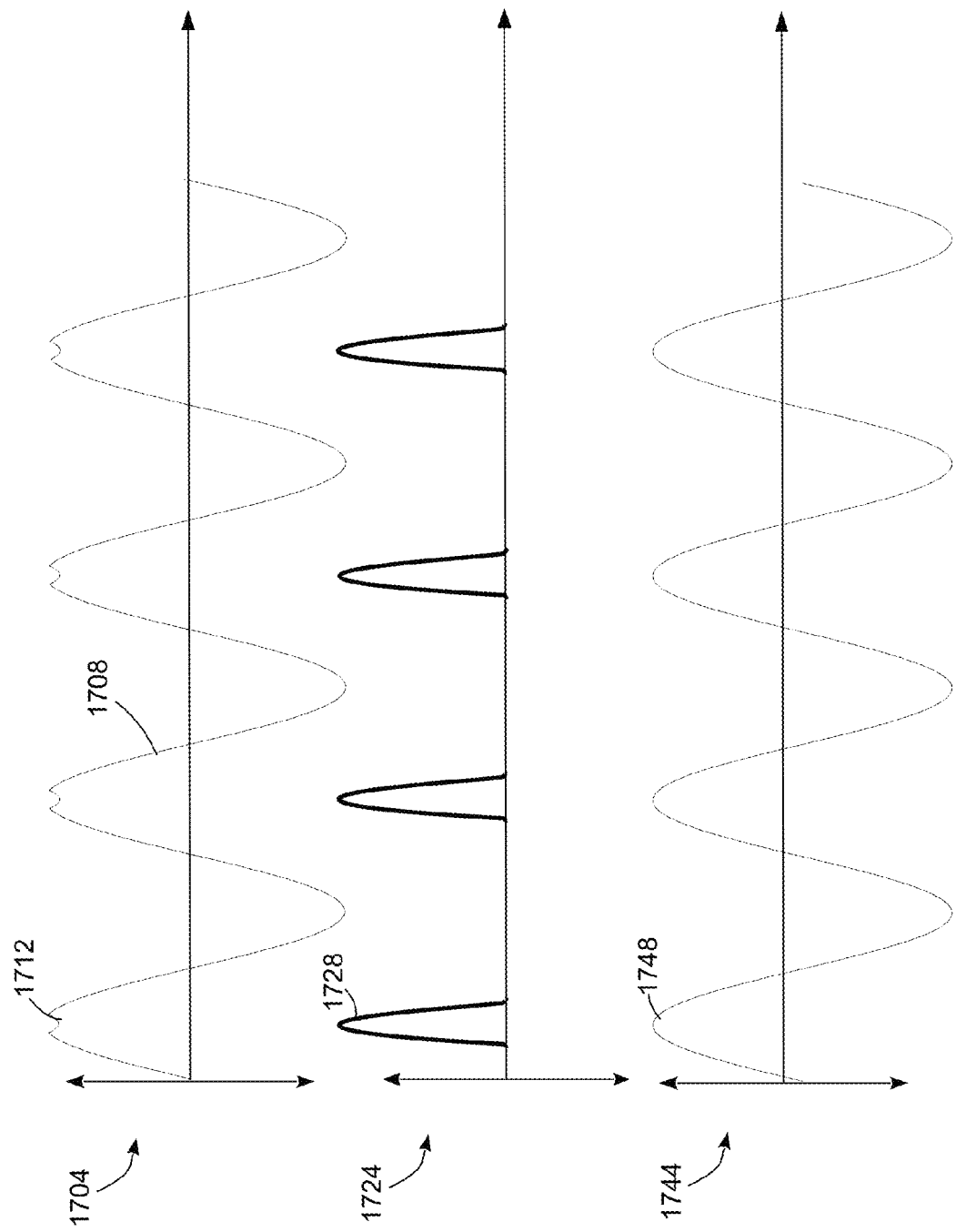
FIG. 17 is a set of graphs depicting a noisy AC signal from an external AC generation source, a correction signal that is generated by the power conditioning system of FIG. 16, and an output sine wave that includes a combination of the noisy AC signal and the correction signal.

FIG. 17 depicts exemplary waveforms from the external AC signal source 1604, the power conditioning system 1600, and the combination of the two signals. In FIG. 17, the graph 1704 depicts an AC signal 1708 that is generated by the external AC signal source 1604. Due to noise, the signal 1708 is not a uniform sinusoidal waveform, but includes a noise component 1712 that disrupts the shape of the AC waveform. In the system 1600, the voltage sensor 1640 detects the signal 1708, and the difference circuit identifies an error between the uniform sinusoid signal from the AC reference signal generator 202 and the portion of the signal 1708 that includes the noise component 1712. The controller 200 adjusts the threshold levels supplied to the comparator 224 to generate a correction signal that is depicted in graph 1724. The correction signal 1728 includes signal waveforms that correspond to the noise components 1712.

Figure 18:
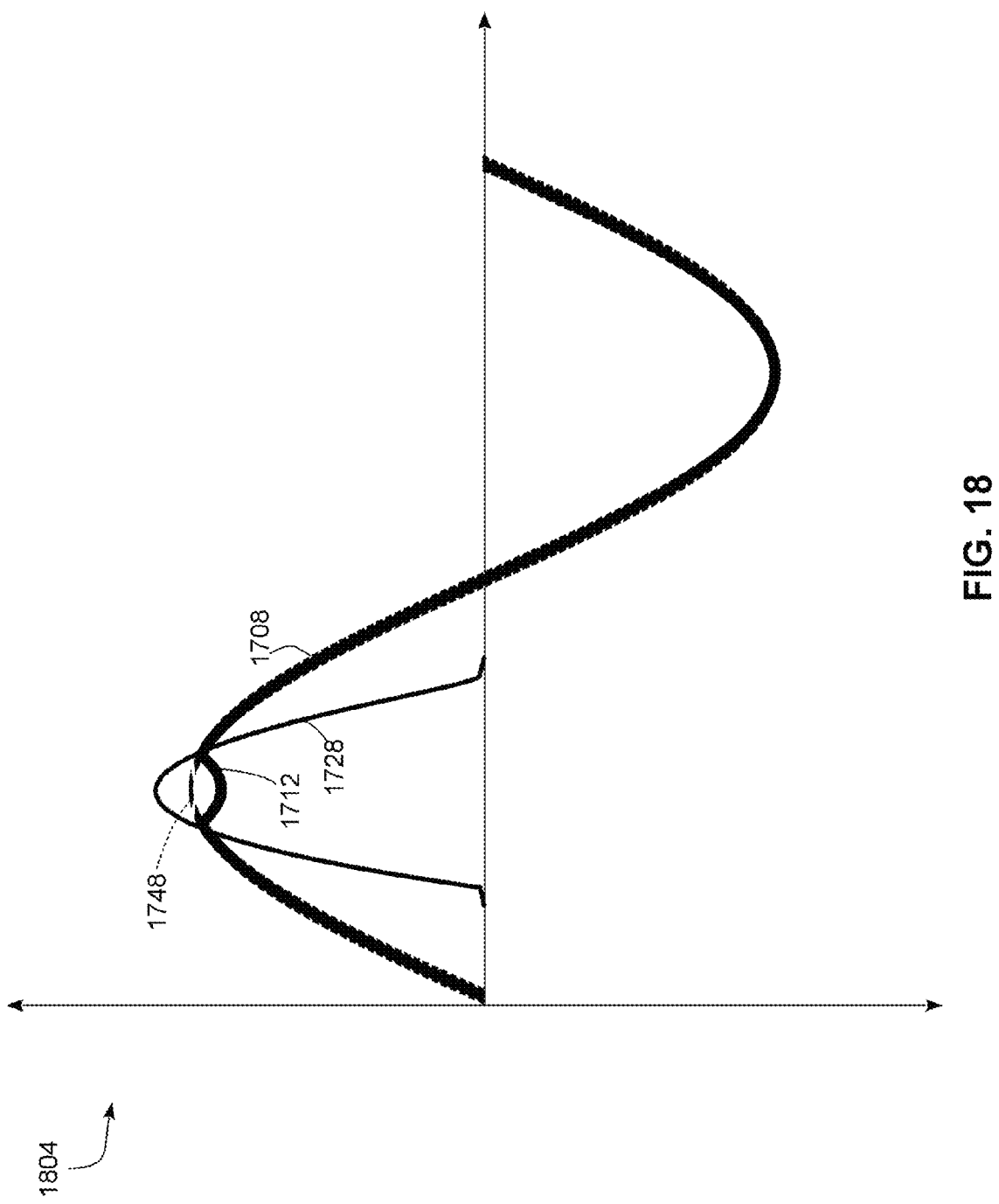
FIG. 18 is a diagram that depicts active cancellation of noise in the signal from the external AC signal source by the correction signal from the power conditioning system of FIG. 16.

In the example of FIG. 17, the noise components 1712 are a depression at the positive peak of the sinusoidal wave 1708. The correction signal is a narrow peak that constructively cancels the depressions 1712 to form a combined smooth sinusoidal output signal. In another situation, the system 1600 generates a correction waveform that destructively cancels a noise component in the external AC signal when the noise results in a higher signal level in the external AC signal than is present in the reference signal waveform. In FIG. 17, the graph 1744 depicts a smooth sinusoidal signal 1748 that is generated from the combination of the noisy signal 1708 and the correction signal 1728. FIG. 18 depicts an overlay of the signals 1708, 1728, and 1748. In FIG. 18, the correction signal 1728 from the system 1600 cancels the noise component 1712 to generate a smooth sinusoidal signal 1748.

While the embodiments have been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A power converter comprising:
   a single switching transistor electrically connected to a direct current (DC) power source having a first voltage level;
   a first inductor-capacitor circuit electrically connected to an output of the single switching transistor and configured to receive electrical power from the DC power source through the single switching transistor in response to the switching transistor being switched on, wherein the first inductor-capacitor circuit includes an inductor and a capacitor, the inductor being connected between the single switching transistor and the capacitor; and
   a second inductor-capacitor circuit electrically connected first inductor-capacitor circuit and configured to provide an output signal to a load; and
   a controller operatively connected to the single switching transistor, the controller being configured to:
   identify an error between the output signal and a reference signal; and
   adjust a duty cycle of a pulse width modulation (PWM) switching signal to switch the single switching transistor at a predetermined frequency with the adjusted duty cycle to reduce the identified error.

2. The power converter of claim 1 further comprising:
   a difference circuit configured to generate an error signal corresponding to a difference between the output signal and the reference signal;
   a signal generator configure to generate a periodic signal at the predetermined frequency; and
   a comparator configured to receive the periodic signal from the signal generator and a control signal from the controller to generate the PWM signal to switch the single switching transistor at the predetermined frequency with the duty cycle of the PWM signal corresponding to a proportion of the periodic signal that is below a level of the control signal from the controller;
   the controller being operatively connected to the difference circuit and the comparator, the controller being further configured to:
   generate the control signal at a level between a minimum level and a maximum level of the periodic signal from the signal generator to adjust the duty cycle of the PWM signal in response to the error signal from the difference circuit.

3. The power converter of claim 2 wherein the periodic signal is a sawtooth signal.

4. The power converter of claim 3, the controller being further configured to:
   switch the single switching transistor off during a portion of each period of the periodic signal during which the periodic signal is greater than a control signal; and
   switch the single switching transistor on during another portion of each period of the periodic signal during which the periodic signal is less than the control signal.

5. The power converter of claim 2, the controller further comprising:
   a proportional-integral (PI) controller configured to generate a PI control signal in response to the identified error;
   an adaptive controller configured to generate an adaptive control signal in response to the identified error and the reference signal; and
   the controller being further configured to generate the control signal in response to the PI control signal and the adaptive control signal.

6. The power converter of claim 1, wherein the reference signal is a DC signal.

7. The power converter of claim 1, wherein the reference signal is an alternating current (AC) signal, the converter further comprising:
   an electrical switching device having an input electrically connected to the output of the single switching transistor and configured to switch at another predetermined frequency corresponding to a frequency of the reference signal to generate an AC output signal from the DC power source.

8. The power converter of claim 7 wherein the electrical switching device comprises two transistors.

9. The power converter of claim 7 wherein the electrical switching device comprises a single triode for alternating current (TRIAC).

10. The power converter of claim 7 wherein the predetermined frequency of switching of the single switching transistor is greater than the other predetermined frequency of switching of the electrical switching device.

11. The power converter of claim 10 wherein the predetermined frequency is in a range of 2 KHz to 20 KHz and other predetermined frequency is one of approximately 50 Hz and approximately 60 Hz.

12. The power converter of claim 1, wherein the reference signal is a DC signal, the converter further comprising:
    an electrical switching device having an input electrically connected to the output of the single switching transistor, the converter being configured to generate a positive output in response to the electrical switching device being in a first configuration and to generate a negative output in response to the switching device being in a second configuration.

13. An electrical inverter system comprising:
    an inverter circuit comprising:
    a single switching transistor configured to be electrically connected to a direct current (DC) power source;
    a transformer having an input electrically connected to an output of the single switching transistor; and
    an electrical switching device having an input electrically connected to an output of the transformer and configured to switch at a first predetermined frequency to generate an alternating current (AC) output from a DC input supplied by the DC power source; and
    a controller operatively connected to the single switching transistor, the controller being configured to:
    generate a pulse width modulation (PWM) switching signal to switch the single switching transistor at a second predetermined frequency, wherein the second predetermined frequency is greater than the first predetermined frequency;

identify an error between a voltage level of an AC reference signal and a measured voltage level of an output signal from the inverter circuit; and set a duty cycle of the PWM switching signal to reduce the identified error.

14. The system of claim 13, the controller comprising:

a proportional-integral (PI) controller configured to generate a first control output signal in response to the identified error; and an adaptive controller configured to generate a second control output signal in response to the identified error and the AC reference signal;

the controller being further configured to set the duty cycle of the PWM switching signal in response to the first control output signal and the second control output signal.

15. The system of claim 14 wherein a sum of a proportional parameter and an integral parameter in the PI controller is greater that a gain parameter in the adaptive controller.

16. The system of claim 13, wherein the electrical switching device further comprises two transistors.

* * * * *